United States Patent [19]
Miyamoto et al.

[11] Patent Number: 5,845,061
[45] Date of Patent: Dec. 1, 1998

[54] REDUNDANT CLIENT SERVER SYSTEM

[75] Inventors: Takahisa Miyamoto, Yokohama; Toshikazu Yasue, Chigasaki; Shuji Ohno, Kawasaki; Norihiro Goto, Ebina, all of Japan

[73] Assignee: Hitachi, Ltd., Tokyo, Japan

[21] Appl. No.: 548,754

[22] Filed: Oct. 26, 1995

[30] Foreign Application Priority Data

Oct. 31, 1994 [JP] Japan .................................. 6-267552
Nov. 30, 1994 [JP] Japan .................................. 6-297028

[51] Int. Cl.$^6$ ...................................................... G06F 11/00
[52] U.S. Cl. ................................. 395/182.02; 395/200.33
[58] Field of Search ...................... 395/182.02, 182.01, 395/180, 181, 431, 200.02, 200.11, 600, 182.09, 182.11, 200.33; 364/269.2, 943.91, 265, 268, 268.9, 284.4; 371/7, 8.1; 345/335

[56] References Cited

U.S. PATENT DOCUMENTS

| | | | |
|---|---|---|---|
| 5,131,089 | 7/1992 | Cole | 364/200 |
| 5,163,131 | 11/1992 | Row et al. | 364/200 |
| 5,343,477 | 8/1994 | Yamada | 395/182.02 |
| 5,394,526 | 2/1995 | Grouse et al. | 364/200 |
| 5,396,613 | 3/1995 | Hollaar | 395/182.02 |
| 5,420,998 | 5/1995 | Horning | 364/200 |
| 5,452,447 | 9/1995 | Nelson et al. | 395/600 |
| 5,452,448 | 9/1995 | Sakuraba et al. | 395/600 |
| 5,535,399 | 7/1996 | Blitz et al. | 395/182.04 |
| 5,537,585 | 7/1996 | Blickenstaff et al. | 395/600 |
| 5,553,242 | 9/1996 | Russel et al. | 364/200 |
| 5,555,404 | 9/1996 | Torbjørnsen et al. | 395/600 |
| 5,566,297 | 10/1996 | Devatakenda et al. | 395/182.13 |
| 5,566,299 | 10/1996 | Billings et al. | 395/182.02 |
| 5,615,353 | 3/1997 | Lautzenheiser | 395/463 |

OTHER PUBLICATIONS

Draft proposed American National Standard for information systems SCSI.
"Design and Mounting of UNIX4, 3BSD", pp. 191–193.

Primary Examiner—Albert DeCady
Attorney, Agent, or Firm—Antonelli, Terry, Stout & Kraus, LLP

[57] ABSTRACT

A client server system has clients, a server of execution system, and a server of fault auxiliary system are connected. A process administrator is provided in each one of the server of execution system and the server of fault auxiliary system. When a fault has occurred in a disk processor in the server of execution system, the process administrator in the server of execution system transmits only "requests" relating to the disk processor among "requests" received from clients to the server of fault auxiliary system. A process administrator in the server of fault auxiliary system conducts corresponding server processing on the "requests" transmitted from the server of execution system.

12 Claims, 29 Drawing Sheets

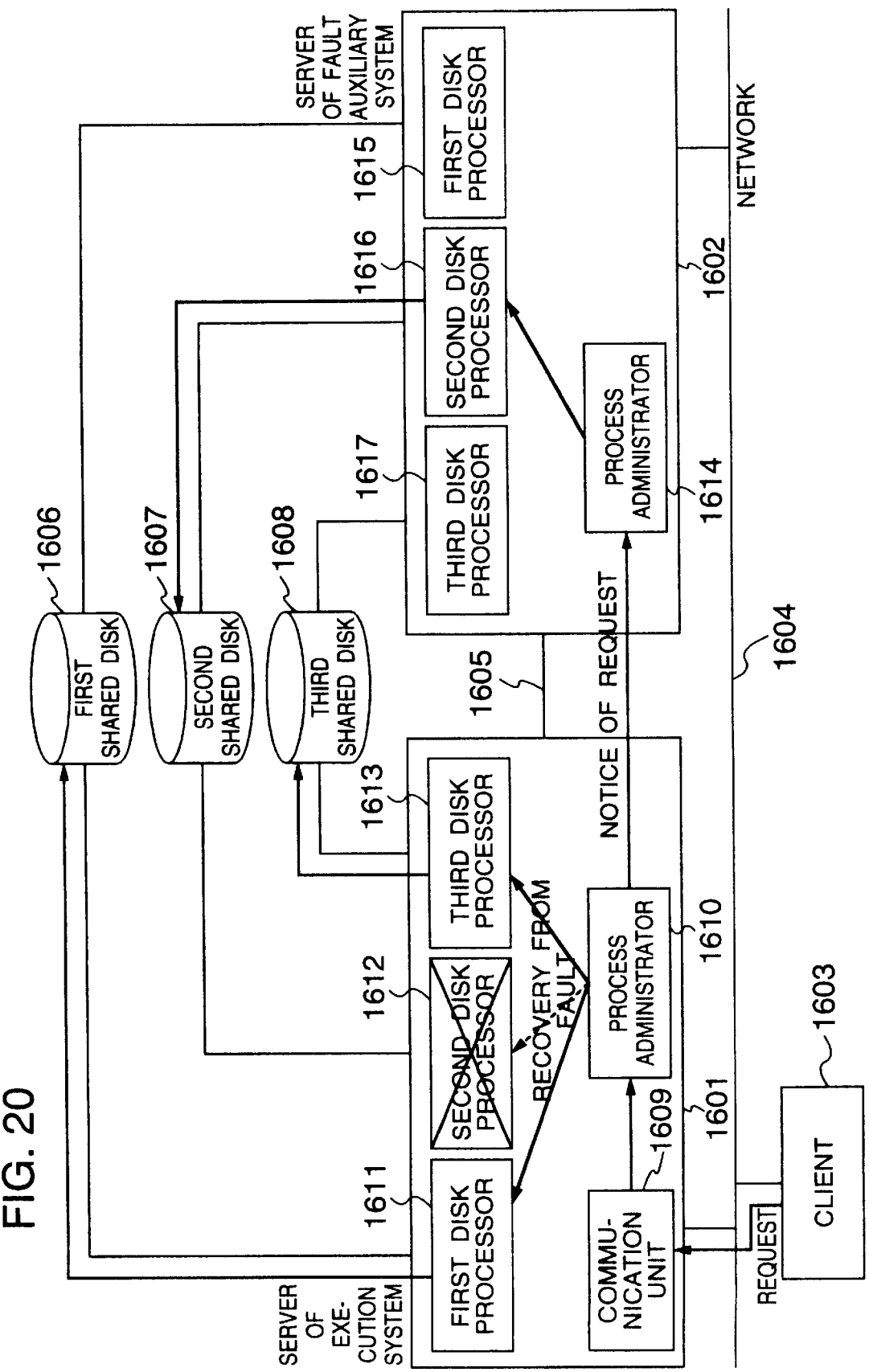

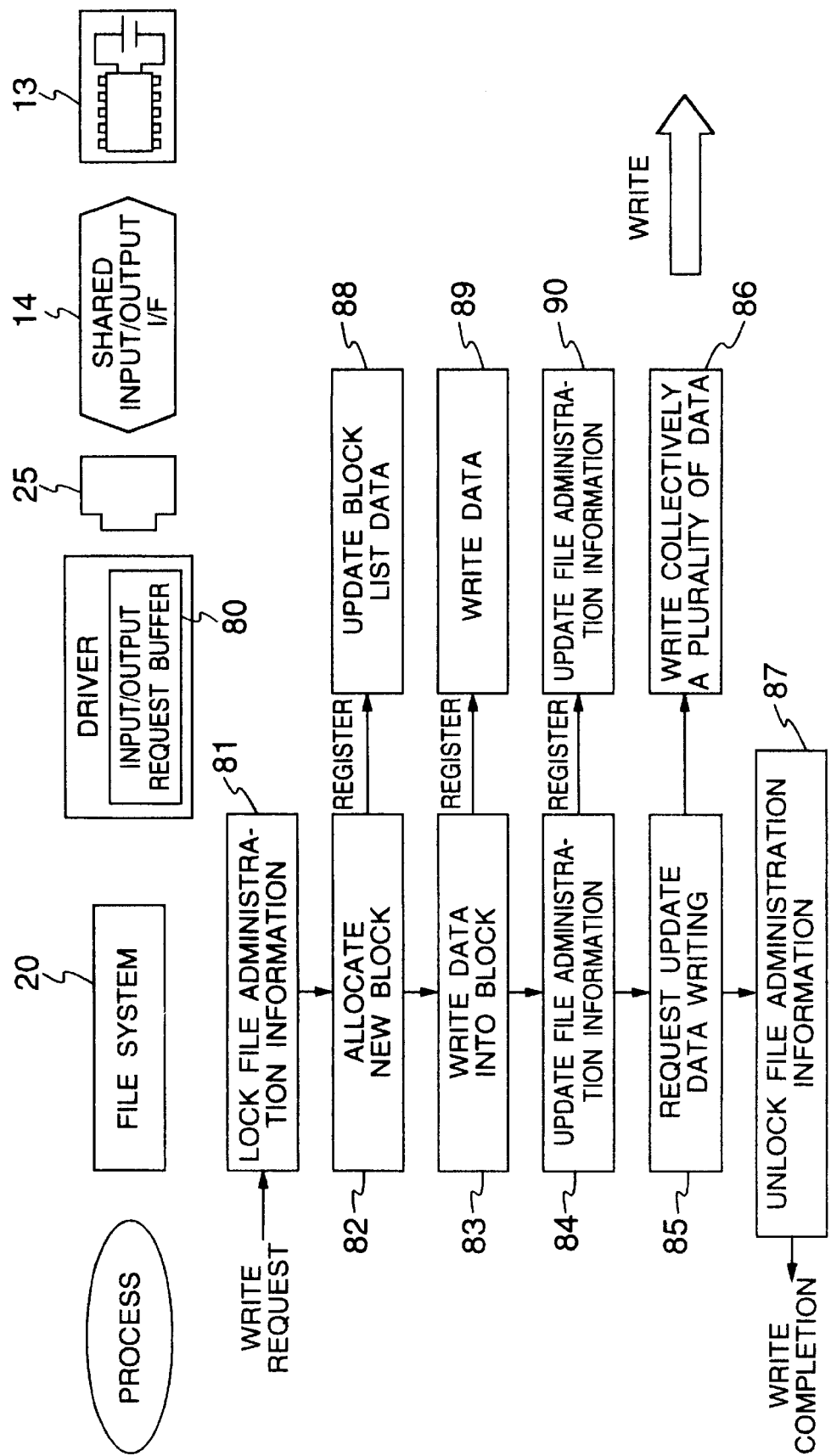

REDUNDANT CLIENT SERVER SYSTEM

BACKGROUND OF THE INVENTION

1. Field of the Invention

The present invention relates to a client server alternation control system, and in particular to a client alternation control system reduced in influence caused by alternation control of a server conducted when a fault has occurred.

2. Description of the Related Art

First of all, a client server system which includes a server of execution system and a server of standby system and which is the subject of the present invention will now be described by referring to FIG. 22. The client server system shown in FIG. 22 includes a client 203, a server of execution system 201 and a server of standby system 202. A disk device 206 such as a hard disk is connected to the server of execution system 201. Via a network 204, the server of execution system 201 conducts processing for a "request" received from the client 203. The server of standby system 202 is connected to the server of execution system 201 via an exclusive communication line 205 and conducts processing instead of the server of execution system 201 when a fault has occurred in the server of execution system 201. Each of the client 203, the execution server 201 and the server of standby system 202 is an information device such as a personal computer or a work station. As the network 204, the Ethernet (trademark of Xerox corporation) or the FDDI (Fiber Distributed Data Interface) is typically employed. As the exclusive communication line 205, the RS-232C is typically employed.

Via the network 204, the client 203 transmits a "request" containing the transmission source, destination and processing contents to the server of execution system 201. Under normal conditions, the server of execution system 201 conducts processing for that "request." The subject of the "request" is the disk device 206. The "request" orders data recorded in the disk device 206 to be read/written. In the case where a fault has occurred in the server of execution system 201, the server of standby system 202 is informed of the fault via the exclusive communication line 205. From that time on, therefore, the server of standby system 202 conducts processing instead of the server of execution system 201.

FIG. 23 shows the configuration of the server of execution system and the server of standby system illustrated in FIG. 22. The server of execution system 201 includes a server processor 301 for processing the "request" supplied from the client 203 and a monitor 302 for monitoring a fault of the server processor 301 and informing the server of standby system 202 of the fault. To be concrete, the server processor 301 is software which operates on the server and mainly conducts processing concerning the disk device 206. Under normal conditions, the server processor 301 and the monitor 302 included in the server of execution system 201 as well as a monitor 304 included in the server of standby system 202 are in the execution state, whereas a server processor 303 included in the server of standby system 202 is in the standby state.

Processing conducted in the conventional server of execution system 201 and server of standby system 202 will now be described by referring to FIGS. 24 through 26.

FIG. 24 shows processing conducted in the normal condition. First of all, the client 203 transmits the "request" to the server of execution system 201. The server processor 301 which is included in the server of execution system 201 and which has received the "request" reads/writes data stroed in the disk device 206, as processing corresponding to the "request." Simultaneously at this time, the monitor 302 in the server of execution system 201 monitors the server processor 301 to check whether any fault has occurred in the server processor 301.

With reference to FIG. 25, if any fault has occurred in the server processor 301 included in the server of execution system 201, the monitor 302 in the server of execution system 201 transmits a notice of occurrence of the fault to the server of standby system 202 via the exclusive communication line 205 between the servers. Upon receiving the notice of the fault, the monitor 304 in the server of standby system 202 starts the server processor 303 in the server of standby system 202. In addition, the server of execution system 201 hands over processing to the server of standby system 202. Contents handed over at this time include information of processing concerning the disk device 206 conducted by the server processor 301 in the server of execution system 201 at the time of occurrence of a fault and communication address definition information set in the server 201 of execution system. By such handing over of the processing information and definition information as heretofore described, alternation processing from the server of execution system 201 to the server of standby system 202 is completed. The server of original standby system functions as a server of new execution system 404 and the server of original execution system 201 functions as a server of new standby system 401.

With reference to FIG. 26, roles are exchanged between the server of execution system 201 and the server of standby system 202 and thereafter the client 203 transmits a "request" to the server 404 of new execution system which is the server of the ex-standby system 202. The server processor 405 in the server of new execution system 404 conducts processing correspondng to the "request." Simultaneously at this time, the monitor 406 in the server of new execution system 404 monitors the server processor 405 to check whether a fault has occurred in the server processor. On the other hand, the server of new standby system 401 which is the server of ex-execution system 201 conducts recovery processing for the faulty server processor 301 by starting up the server machine again and then gets into the standby state in preparation for a fault notice.

The above described conventional client server system has two problems described below.

(1) In the case where a fault has occurred in the server processor in the server of execution system, the server of execution system hands over processing information of the interrupted server processing and definition information concerning the communication processing to the server of standby system. The client must change the address of a "request" from the server of execution system to the server of standby system. Therefore, the client must be always conscious of a server which should process the "request."

(2) Even in the case where a fault occurs only in an extremely small part of processing conducted by the server processor in the server of execution system, the fault actually occurs in the disk input/output portion in most cases. Since all processing is handed over to the server of standby system, the time required for the handing over, i.e., the interruption time of server processing for the "request" is prolonged. When the subject of alternation processing is a disk device having a large capacity, therefore, the above described handing over requires much time.

FIG. 31 shows the configuration of a remote file system which is an example of the client server system. A server 10a and a server 10b are in alternation relations, and they can provide equal services. For making it possible to monitor operation situations each other between the servers 10a and 10b, share information between the servers 10a and 10b, and hand over information in the case where a fault has occurred in either of the two servers, a dual-port I/F hard disk device (HDD) 120 is provided. The HDD 120 has two connection ports which can be connected to both the server 10a and the server 10b in a hardware manner. Simultaneously, in order to improve the reliability of data recorded in the HDD 120, logging for the input/output processing situation in the servers 10a and 10b is also performed.

Hereafter, input/output processing in the above described client server system will be described briefly by referring to drawing.

FIG. 32 shows the configuration of a portion of the server illustrated in FIG. 31 concerning the input/output processing. As shown in FIG. 32, the HDD 120 is connected to the servers 10a and 10b (not illustrated) via a SCSI (Small Computer System Interface) bus 15. The SCSI bus is the standard of a general purpose external device connection interface in UNIX work stations. By using an SCSI bus controller 23 of hardware and an SCSI bus driver 22 which is control software of the SCSI bus controller 23, the server 10a (10b) transfers data to the SCSI bus 15. Data to be actually written into the HDD 120 is adjusted so that the data size will become integer times as large as a predetermined storage size on the HDD 120. The predetermined storage size is typically one sector which is equivalent to 512 bytes. Then the data is held in a main storage 26 by a block buffer cache 21 for a fixed time and then outputted to the HDD 120 via the SCSI bus. The block buffer cache 21 is provided to reduce the number of times of input/output processing conducted for the HDD 120 which is significantly slow in processing speed because it has a mechanical component. The block buffer cache 21 is called disk cache as well. Actual data are stored in the main storage 26.

Data input/output control effected between the server 10a (10b) and the HDD 120 via the SCSI bus is effected on the basis of contents of a command block 50 shown in FIG. 33. In the command block 50, there are contained a set of combinations of a block address 52 representing the top position of storage location of data and transfer data length 53 representing the amount of data to be transferred from the block address 52. The combination uniquely determines transfer data.

FIG. 34 is a diagram showing the flow of file writing processing in the conventional client server system. FIG. 34 illustrates processing conducted from the time when an arbitrary process in the server 10a (10b) issues a write request until completion of the file writing corresponding to the write request is returned to the process. With reference to FIG. 34, upon receiving a write request from the process, a file system 20 conducts lock processing for declaring that it has acquired the right of processing file administration information concerning a file located in the file system and indicated by the write request, thereby a race among a plurality of request being prevented (step 61). Thereafter, the file system 20 performs block allocation of the block buffer cache for newly storing data of the write request, updates the pertinent location of a block list 66 for administering empty blocks, and writes data into the block buffer cache 21 of the update location (step 62). And the file system 20 stores data of the write request into the above described newly allocated block secured in the block buffer cache 21 (step 63). The file system 20 sets block information having data written therein in pertinent file administration information and writes update file administration information into the block buffer cache 21 (step 64). Thereafter, the file system 20 conducts unlock processing for declaring that it abandons the right of processing of the file administration information (step 65). The file system informs the process which issued the write request of completion of write processing. Thereafter, upon occurrence of a cache flash event (which indicates the timing reflecting, to the HDD 120, information which is written into the block buffer cache 21 and which is not updated), held data is written in a plurality of installments on the basis of the command block shown in FIG. 33. At the time point when the write completion is informed of, the data is not written into the HDD 120.

Input/output processing in the UNIX is described in detail in "Design and Mounting of UNIX4.3BSD" written by S. J. Leffler et al., translated by Akira, Nakamura et al., and published by Maruzen. Data transfer on the SCSI bus is described in detail in ANSI SCSI Specification.

In the conventional client server system, usefuness is improved by disposing, in a computer system of deccentralized processing type having a LAN as a medium, a plurality of server machines capable of providing equal services. Since consideration as to input/output processing in the UNIX file system is insufficient, however, the following problems are pointed out.

(1) The data to be written into the HDD is stored in the main storage for a fixed period by the block buffer cache in each server machine. From the time when the write is completed on the process until it is reflected to the HDD, therefore, data matching cannot be assured.

(2) In writing via the SCSI bus, only consecutive data storage areas can be specified as the subject of update at a time. This is a problem specific to SCSI buses. In actual file writing processing in which a plurality of nonconsecutive data storage areas are updated, writing is performed independently for respective data storage areas requiring update. If the server machine is alternated during writing processing of non-consecutive areas in the same file, therefore, a contradiction occurs in the data storage structure on the HDD.

(3) In the case where input/output processing conducted in each server machine is being logged in the case of (2), the data storage structure on the HDD can be reconstructed. However, it takes a considerable time to reconstruct data on the HDD on the basis of the log data.

SUMMARY OF THE INVENTION

Therefore, it is an object of the present invention to provide a client server alternation control system in which interruption time of server processing caused by alternation processing when a fault has occurred is shortened as compared with the conventional technique and the client need not be especially conscious of the above described alternation processing.

Furthermore, another object of the present invention is to provide a client server system in which matching of data used in common between server machines is always assured, the data storage structure on the HDD is not destroyed even if the server machine is alternated by occurrence of a fault, and handing over of processing consequent upon alternation is conducted rapidly.

In order to achieve the above described objects, a client server alternation control system according to the present invention is a client server system in which a client for requesting specific processing by originating a "request" and a server of execution system and a server of auxiliary system each having a disk processor for conducting server processing corresponding to a processing request specified in each "request" are interconnected, and the server of execution system includes a process administrator for administrating alternation control of the server processing by conducting transfer processing of the "request" to the server of auxiliary system in the case where server processing relating to the accepted "request" is impossible.

Furthermore, the transfer processing of the "request" is conducted in the case where any fault has occurred in the server processor in the server of execution system which has accepted a "request" or in the case where the server of execution system having a fault therein has accepted a new "request."

Furthermore, the process administrator includes a state administration table for registering the state of the disk processor and a fault monitor for monitoring occurrence of a fault in the disk processor and for updating registration of the state administration table. And the transfer processing of the "request" is conducted in accordance with registration contents of the state administration table.

The process administrator includes a fault recovery unit for causing recovery from a fault which has occurred in the disk processor. In the case where a new "request" has been accepted after the disk processor was made to recover from the fault by the fault recovery unit, the disk processor conducts disk processing with respect to the client which has originated the "request."

The server of execution system and the server of auxiliary system are interconnected via an exclusive communication line. The process administrator has an interserver communication unit for conducting transfer processing of the "request" via the exclusive communication line.

In the case where any fault has occurred in the server processor when there is a fault in the exclusive communication line, the interserver communication unit conducts transfer processing of the "request" via the network.

Each of the server of execution system and the server of auxiliary system is capable of having a plurality of disk processors. The process administrator can transfer only the "requests" relating to the disk processor having a fault to the server of auxiliary system.

In a client server system having the server of execution system and a plurality of servers of auxiliary systems which are interconnected, connection states of respective servers of auxiliary systems with a shared disk and network addresses are registered in state administration tables of respective servers, and the server of auxiliary system which is the transfer destination of the "request" is selected in accordance with registered contents of the state administration table.

In a client server system in which first and second clients, a server of first execution system corresponding to a processing request specified in a "request" accepted from the first client, and a server of second execution system corresponding to a processing request specified in a "request" accepted from the second client are interconnected, the server of first execution system includes a first process administrator for transferring the "request"accepted from the first client to the server of second execution system when any fault has occurred in the server processor included in the server of first execution system, and the server of second execution system includes a second process administrator for transferring the "request" accepted from the second client to the server of first execution system when any fault has occurred in the server processor included in the server of second execution system.

Operation based upon the above described configuration will now be described.

In a client server alternation control system according to the present invention, the server of execution system transfers the "request" to a server of auxiliary system in the case where server processing relating to the accepted "request" is impossible. Thus the server of execution system can make the server of auxiliary system execute corresponding server processing without making the client originating the "request" conscious of the server conducting the processing.

The process administrator includes a state administration table and a fault monitor for registering and updating the state administration table. And the transfer processing of the "request" is conducted in accordance with registration contents of the state administration table. Simultaneously with occurrence of a fault in the server of execution system, therefore, transfer of the "request" to a different server of auxiliary system is started. As a result, degree of influence of server processing interruption caused by occurrence of a fault can be decreased.

The process administrator includes a fault recovery unit. In the case where a new "request" has been accepted after the disk processor was made to recover from the fault by the fault recovery unit, the disk processor conducts server processing with respect to the client which has originated the "request." Since simultaneously with occurrence of a fault in the server of execution system its recovery processing is automatically started, duration of emergency evacuation operation form conducted by only the server of auxiliary system accompanied by transfer processing of the "request" can be shortened.

In the case where any fault has occurred in the server processor when there is a fault in the exclusive communication line, the interserver communication unit conducts transfer processing of the "request" via the network. Even if there should be a fault on the exclusive communication line, therefore, the system operation can be continued.

In the case where each of the server of execution system and the server of auxiliary system has a plurality of disk processors, the process administrator transfers only "requests" relating to the disk processor having a fault to the server of auxiliary system. Thereby, the amount of processing to be handed over to the server of auxiliary system by the server of execution system can be reduced. As a result, interruption time of server processing caused by handing over can be shortened.

By making it possible to alternation to a plurality of servers of auxiliary systems, processing can be distributed among a plurality of servers of auxiliary systems.

Upon occurrence of a fault, a server of first execution system and a server of second execution system may substitute for each other in server processing. In the normal operation state, therefore, loads for a server of first execution system and a server of second execution system are equalized. In addition, the reliability and efficiency of the system are improved.

Furthermore, a client server system of a different form according to the present invention includes a solid state disk device (SSD) capable of performing input/output access at a higher speed than the hard disk device (HDD) belonging to each server machine and having a battery backup function. By using the file system copied from the HDD to the SDD, the server machine conducts service processing.

Via a shared input/output interface for directly inputting/outputting data without using a cache memory, the SSD is used in common by server machines.

Data inputting to/outputting from the SSD is conducted in the lump on the basis of input/output request frame and input/output answer frame exchanged between the SSD and server machines connected via the shared input/output interface.

Operation based upon the above described configuration will now be described.

A client server system according to the present invention includes a solid state disk device (SSD). The SSD inputs/outputs data without using a cache memory. Therefore, matching between data written by the process and data actually recorded in the SSD can be assured.

Data inputting to/outputting from the SSD is conducted in the lump. When a fault has occurred in a server machine, therefore, data concerning the file structure on the SSD is prevented from being handed over to the substitute server machine in a halfway state during updating. Thus destruction of the data storage structure can be prevented at the time of occurrence of a fault.

BRIEF DESCRIPTION OF THE DRAWING

FIG. 20 is a diagram showing the flow of the entire processing in the case where the system of FIG. 15 is in the middle of recovery from a fault;

FIG. 30 is a diagram showing the flow of file writing processing in a client server system according to the present invention;

DESCRIPTION OF THE PREFERRED EMBODIMENTS

Hereafter, embodiments of a client server alternation control system according to the present invention will be described in detail by referring to drawing.

Figure 1:
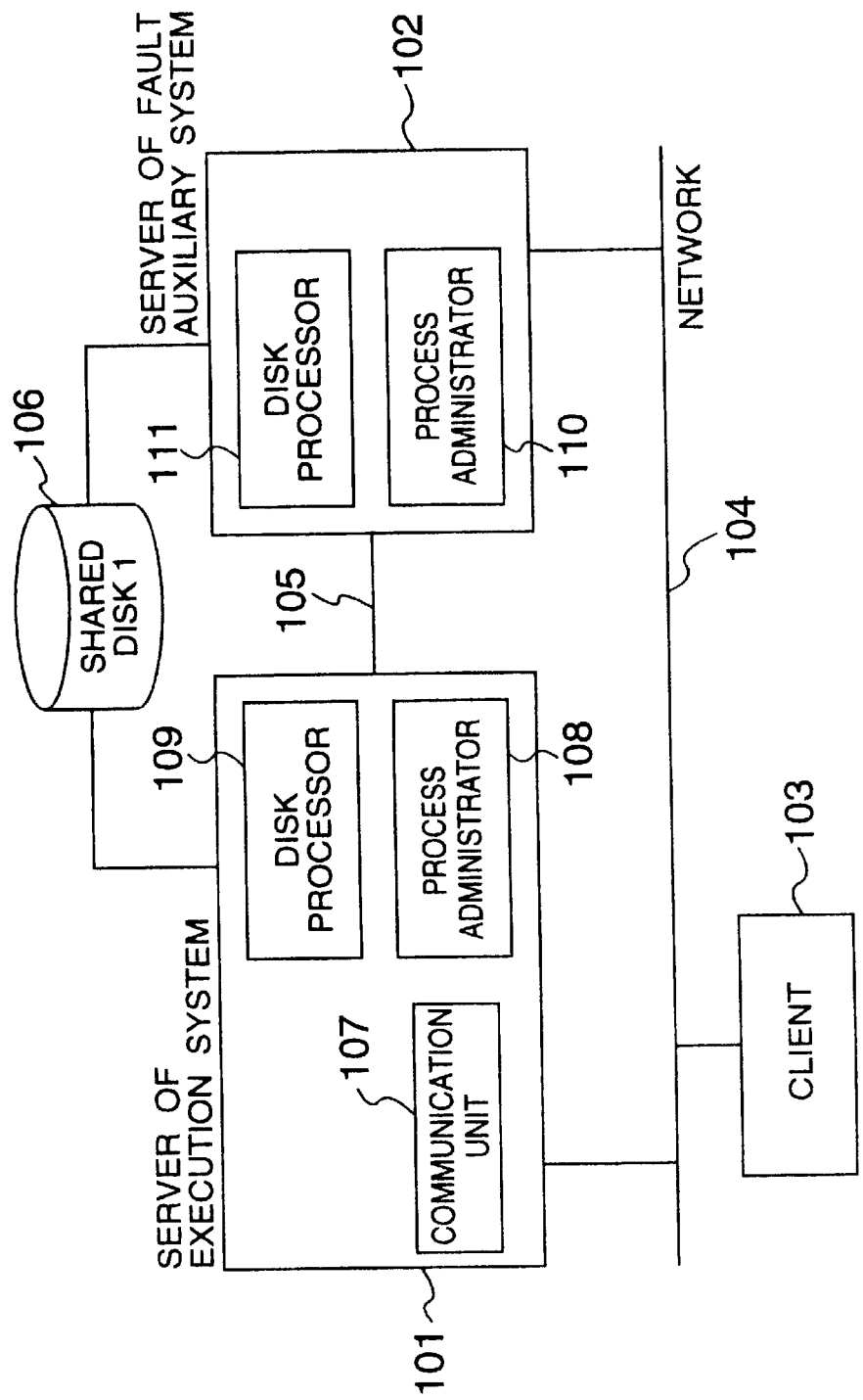
FIG. 1 is a block diagram showing the entire configuration of a first embodiment of a client server alternation control system according to the present invention.

FIG. 1 is a block diagram showing the entire configuration of a first embodiment of a client server alternation control sytem according to the present invention. An example of use of a server processing control device as a file server is illustrated. In FIG. 1, a client 103, a server of execution system 101, and one server of fault auxiliary system 102 are connected via a network 104. The client 103 transmits a "request" to a server. The server of execution system 101 receives the "request" from the client 103 and conducts processing for the "request" (such as reading/writing contents of a shared disk which is connected thereto). The server of fault auxiliary system 102 conducts processing instead of the server of execution system 101 when a fault has occurred in the server of execution system 101. Furthermore, the server of execution system 101 and the server of fault auxiliary system 102 are interconnected by an exclusive connection line 105. Communication between servers is conducted via the exclusive communication line 105. It is assumed that the shared disk 106 is a "dual port disk" having two interfaces for access.

The server 101 of execution system includes a communication unit 107, a disk processor 109 and a process adinistrator 108. The communication unit 107 receives a "request" from the client 103. The disk processor 109 conducts processing for the "request." The process administrator 108 delivers the "request" to the disk processor 109, monitors the operation state of the disk processor 109, and conducts processing for causing the disk processor 109 to recover from a fault when the fault has occurred. The server of fault auxiliary system 102 includes a disk processor 111 and a process administrator 110. The disk processor 111 conducts processing similar to that of the server of execution system 101. When a fault has occurred in the server of execution system 101, the process administrator 110 accepts the "request" transmitted from the process administrator 108 on the server of execution system and delivers the "request" to the disk processor 111.

In general, a server includes a processor, a memory, a disk, and an interface to the network. The disk processor, the communication unit and the process administrator are implemented by execution of software effected by the processor. Each of the disk processor and the communication unit includes a disk interface and a network interface, and may have an individual processor.

Figure 2:
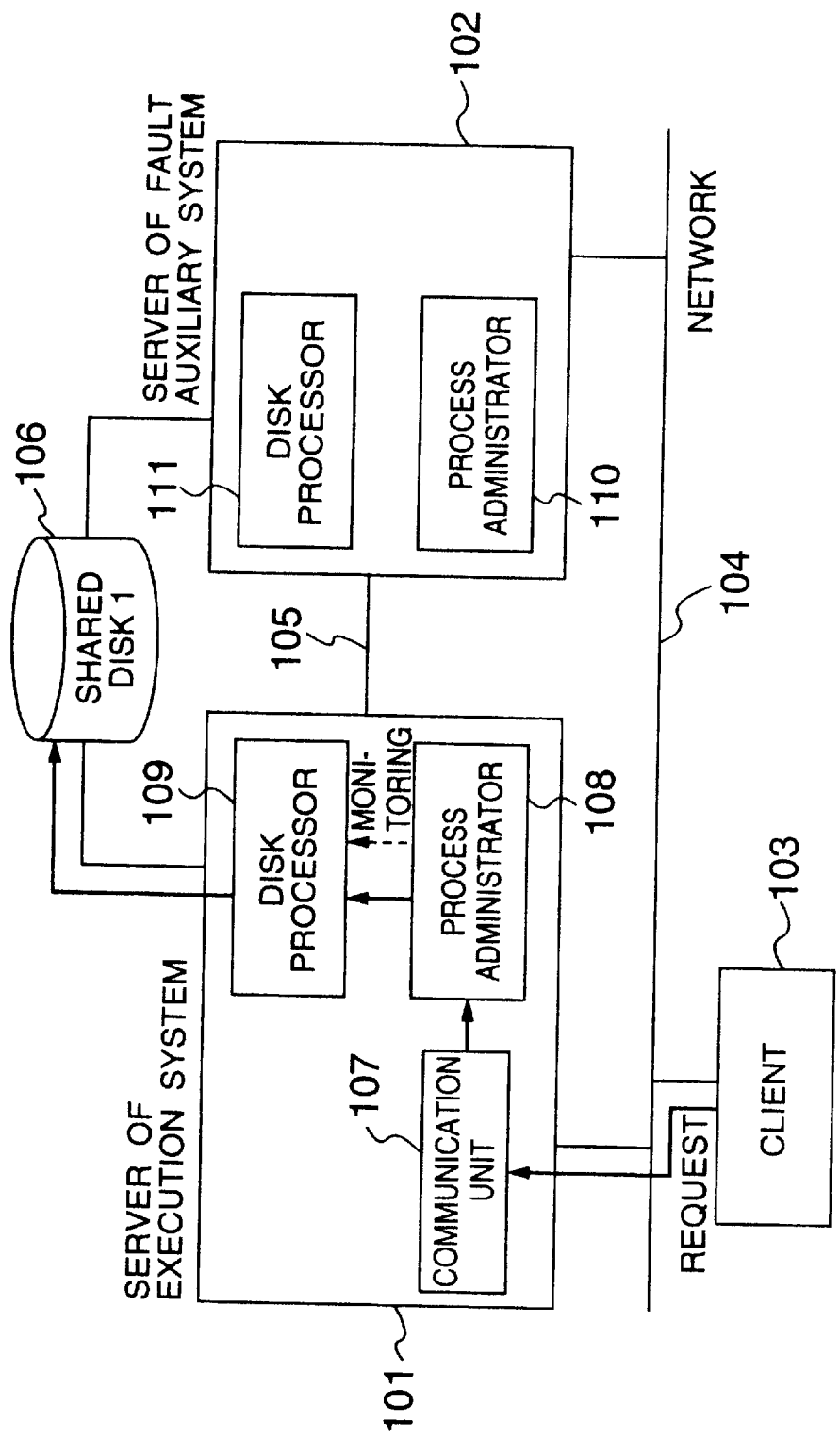
FIG. 2 is a diagram showing the flow of the entire processing in the case where the system of FIG. 1 is in the normal state.
Figure 3:
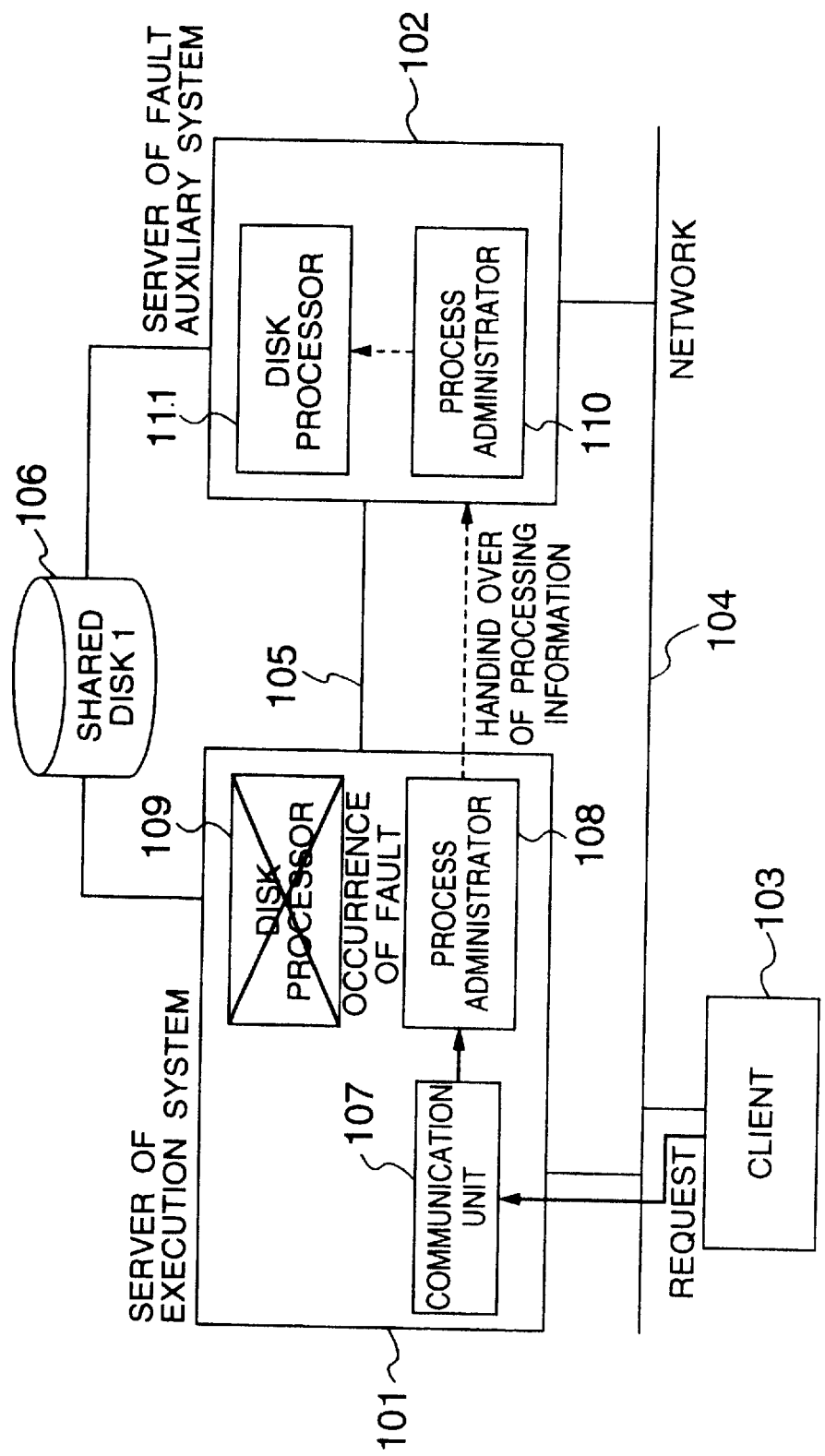
FIG. 3 is a diagram showing the flow of the entire processing conducted at the time when a fault has occurred in the system of FIG. 1.
Figure 4:
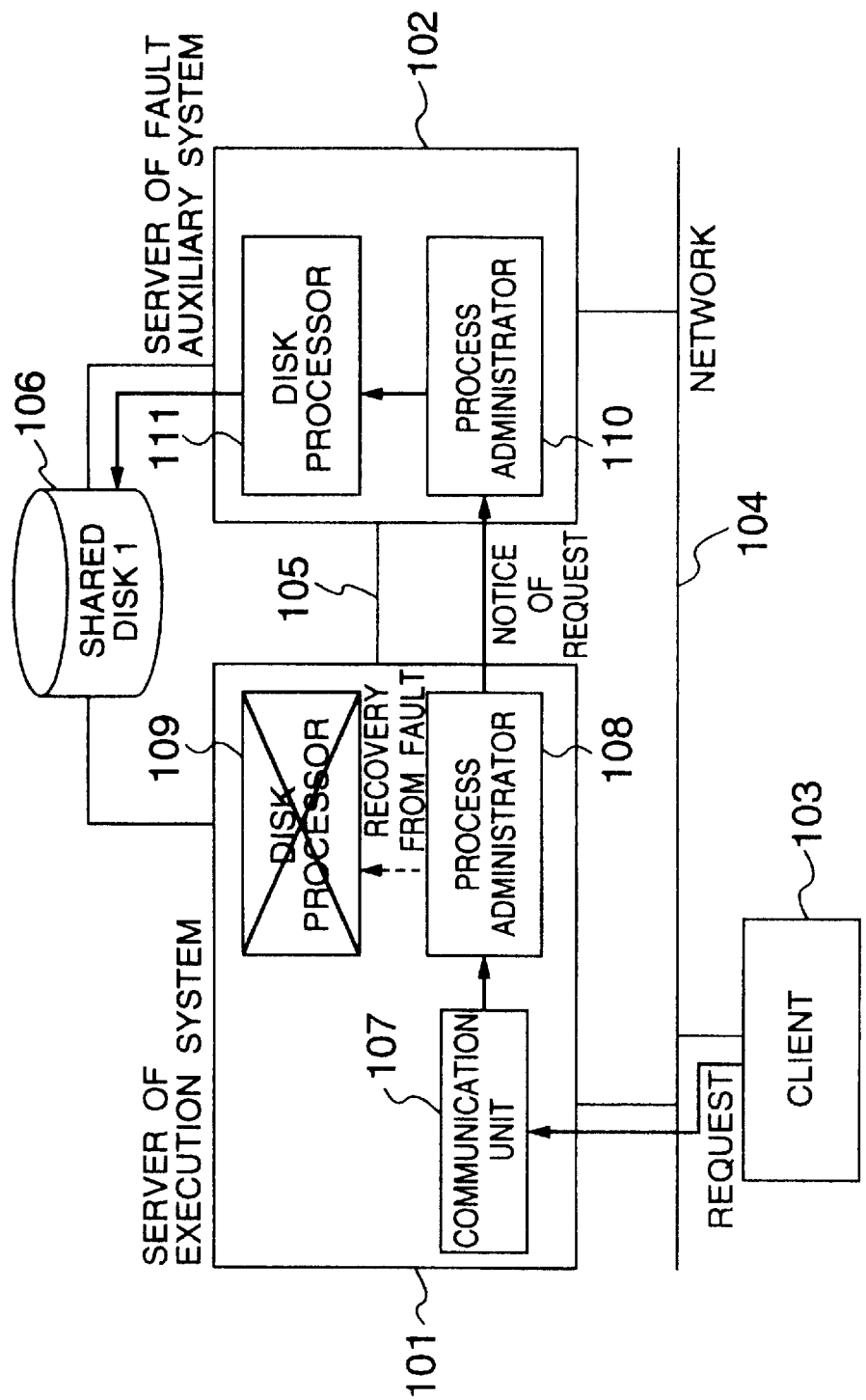
FIG. 4 is a diagram showing the flow of the entire processing in the case where the system of FIG. 1 is in the middle of recovery from a fault.

An example of processing of each server processing control device conducted in the case where a fault has occurred in the disk processor 109 mounted on the server of execution system 101 will now be described by referring to FIGS. 2 through 4.

First of all, processing of the normal state will now be described by referring to FIG. 2. With reference to FIG. 2, it is now assumed that the client 103 transmits a "request," which contains the transmission source, destination and contents of processing, to the server of execution system 101 via the network 104. Then the communication unit 107 of the server of execution system 101 receives the "request." When the communication unit 107 has delivered the received "request" to the process administrator 108, the process administrator 108 delivers the "request" to the disk processor 109. The disk processor 109 to which the "request" has been deliverd conducts specified processing such as data reading from/writing to the shared disk 106 as processing for the "request." Furthermore, by using a method such as polling, the process administrator 108 always monitors the disk processor 109 to check whether a fault has occurred therein.

Processing conducted when a fault has occurred will now be described by referring to FIG. 3. Upon occurrence of a fault in the disk processor 109 shown in FIG. 3, the process administrator 108 hands over processing information to the process administrator 110 on the server of fault auxiliary system 102 via the exclusive communication line 105. Processing information to be handed over is information conducted for the shared disk 106 by the disk processor 109, such as information of the file system structure and log of the number of times of access at the time of occurrence of a fault. The process administrator 110, to which the server of execution system 101 handed over processing information, delivers processing information of the server of execution system 101 to the disk processor 111. At this time, a "request" transmitted from the client 103 which has arrived at the server of execution system 101 in the middle of handing over of the processing information is stored in the process administrator 108. After handing over has been completed, the "request" stored in the process administrator 108 is transmitted to the server of fault auxiliary system 102. Thereafter, the "request" is processed in the server of fault auxiliary system 102. An answer to the request is passed conversely through the path through which the "request" was transferred and is returned to the client 103.

Processing conducted when recovery from a fault has been effected will now be described by referring to FIG. 4. In FIG. 4, the process administrator 108 on the server of execution system 101 conducts recovery processing such as restart-up of the disk processor 109 in which a fault has occurred. In the case where a "request" for the disk processor 109 has arrived at the server of execution system 101 during execution of the recovery processing, the process administrator 108 transmits the "request" to the process administrator 110 on the server of fault auxiliary system 102 via the exclusive communication line 105. Upon receiving the "request" from the server of execution system 101, the process administrator 110 on the server of fault auxiliary system 102 delivers the "request" to the disk processor 111. Upon receiving the delivered "request," the disk processor 111 conducts processing such as reading/writing data from/ into the shared disk 106 as processing for the "request." Upon completion of the recovery processing of the disk processor 109 conducted by the process administrator 108 on the server of execution system 101, the server of execution system 101 returns to the normal state shown in FIG. 2. The process administrator 108 delivers all "requests" received from the client 103 to the disk processor 109 of the server of execution system 101.

Subsequently, the configuration and processing of the process administrator 108 will now be described.

Figure 5:
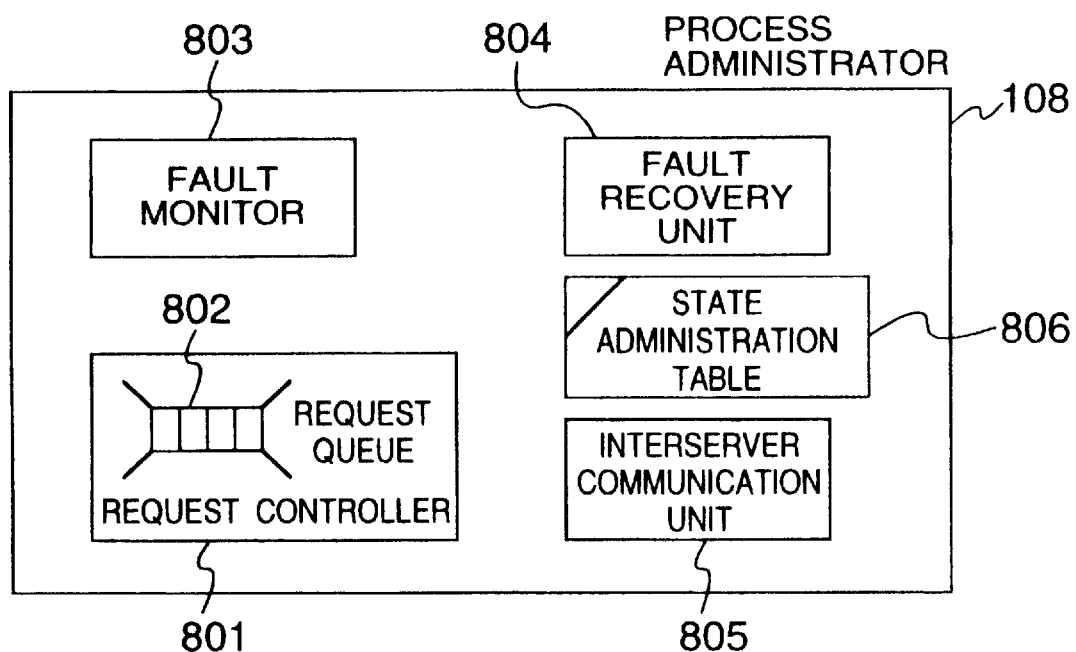
FIG. 5 is a diagram showing the detailed configuration of a process administrator in the system of FIG. 1.

FIG. 5 is a diagram showing the configuration of the process administrator in the system of FIG. 1 in detail. As shown in FIG. 5, the process administrator 108 includes a state administration table 806, a request controller 801, a fault monitor 803, a fault recovery unit 804, and an interserver communication unit 805. These are implemented by software executed by the processor. In the state administration table 806, the state of the disk processor, which processes the "request" received from the client 103, is registered. Registered information is either "normal state," in which processing for a "request" can be conducted, or "fault occurrence," in which processing cannot be conducted because the disk processor is in the middle of occurrence of a fault or in the middle of recovery from a fault. The request controller 801 has a request queue 802 for storing the "request" received from the client 103. By referring to the state administration table 806, the request controller 801 delivers the "request" delivered from the communication unit 107 to a disk processor which is in the "normal state."

By performing polling for the disk processor, the fault monitor 803 always monitors the disk processor to check whether a fault has occurred in the disk processor. When a fault has occurred, the fault monitor 803 updates contents of the state administration table 806 and starts the fault recovery unit 804. The fault recovery unit 804 conducts recovery processing such as restart-up of the disk processor in which a fault has occurred. For restoration, H/W exchange is required in some cases. The interserver communication unit 805 transmits a "request" from the process administrator 108 on the server of execution system 101 to the process administrator 110 on the server of fault auxiliary system 102 via the exclusive communication line 105.

The configuration of the state administration table will now be described by referring to FIG. 6.

Figure 6:
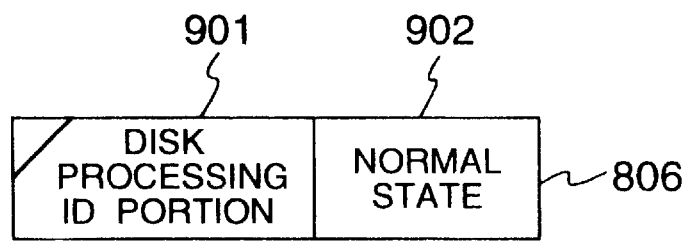
FIG. 6 is a diagram showing an example of information which is set in a state administration table illustrated in FIG. 5.

FIG. 6 is a diagram showing an example of information set in the state administration table illustrated in FIG. 5. As shown in FIG. 6, the state administration table 806 includes a disk processing ID portion 901 and a process state portion 902. In the disk processing ID portion 901, an identifier of the disk processor to be monitored for a fault is registered. As the identifier, a process number peculiar to the disk processor or a memory address in which the disk processor is located is used. In the process state portion 902, the state of the disk processor is registered. The registered content is either "normal state" or "occurrence of fault" as described above.

Processing of the process administrator 108 will now be described by referring to FIGS. 7 through 13.

Figure 7:
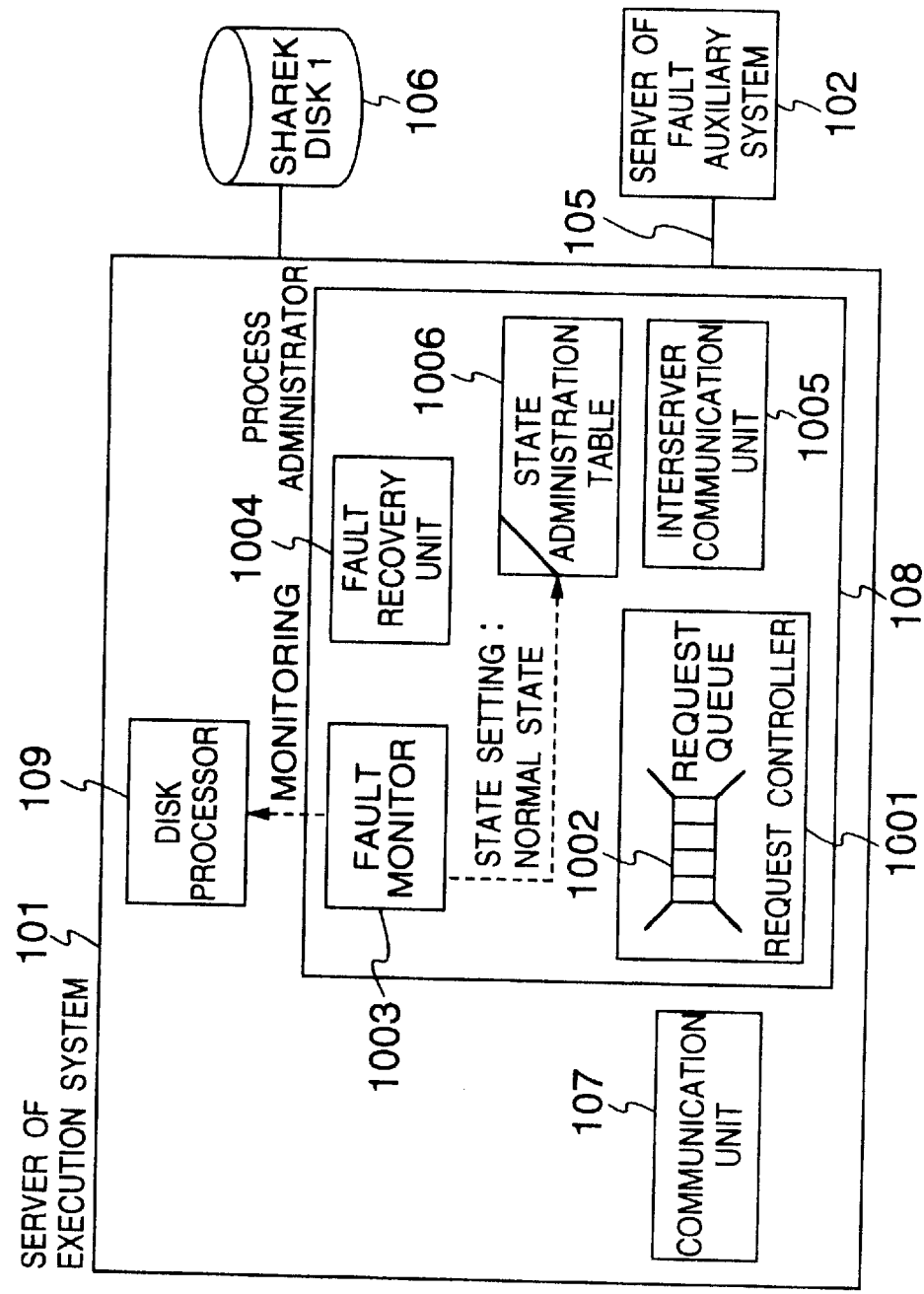
FIG. 7 is a diagram showing details of processing conducted in a process administrator included in a server of execution system when the system of FIG. 1 is initialized.

FIG. 7 is a diagram showing details of processing conducted in the process administrator in the server of execution system when the system of FIG. 1 is initialized. Initializing processing executed at the time of server start-up is illustrated. As initialization of the process administrator 108 shown in FIG. 7, a fault monitor 1003 monitors the disk processor 109 which is the server processor monitored for fault and registers the state of the disk processor 109 into a state administration table 1006. Registered contents are an identifier of the disk processor 109 and the state of the disk processor 109. The state at the time of initialization is registered as "normal state."

Figure 8:
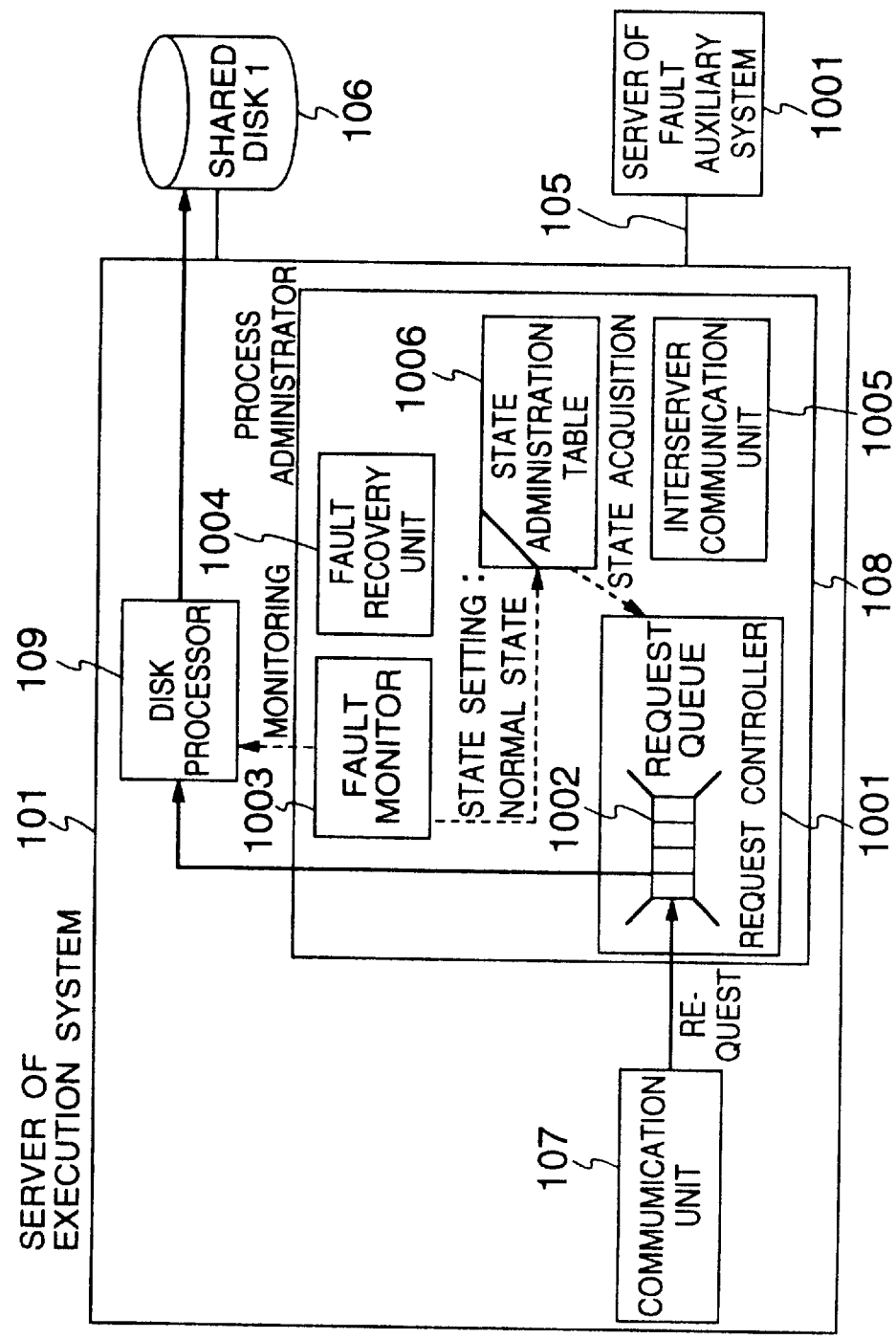
FIG. 8 is a diagram showing details of processing conducted in a process administrator included in a server of execution system when the system of FIG. 1 is in a normal state.

FIG. 8 is a diagram showing details of processing conducted in the process administrator in the server of execution system in the case where the system of FIG. 1 is in the normal state. With reference to FIG. 8, a request controller 1001 stores a "request" fed from the communication unit 107 into a request queue 1002. By referring to the state administration table 1006, the request controller 1001 acquires process information concerning a disk processor which is a server processor which should process the "request." In the case of FIG. 8, the state of the disk processor 109 is "normal state." Therefore, the request controller 1001 delivers the received "request" to the disk processor 109 on the server of execution system 101. Upon receiving the delivered "request," the disk processor 109 conducts processing such as reading/writing data from/into the shared disk 106 as processing for the "request." Furthermore, the fault monitor 1003 always monitors the disk processor 109 to check whether a fault has occurred.

Figure 9:
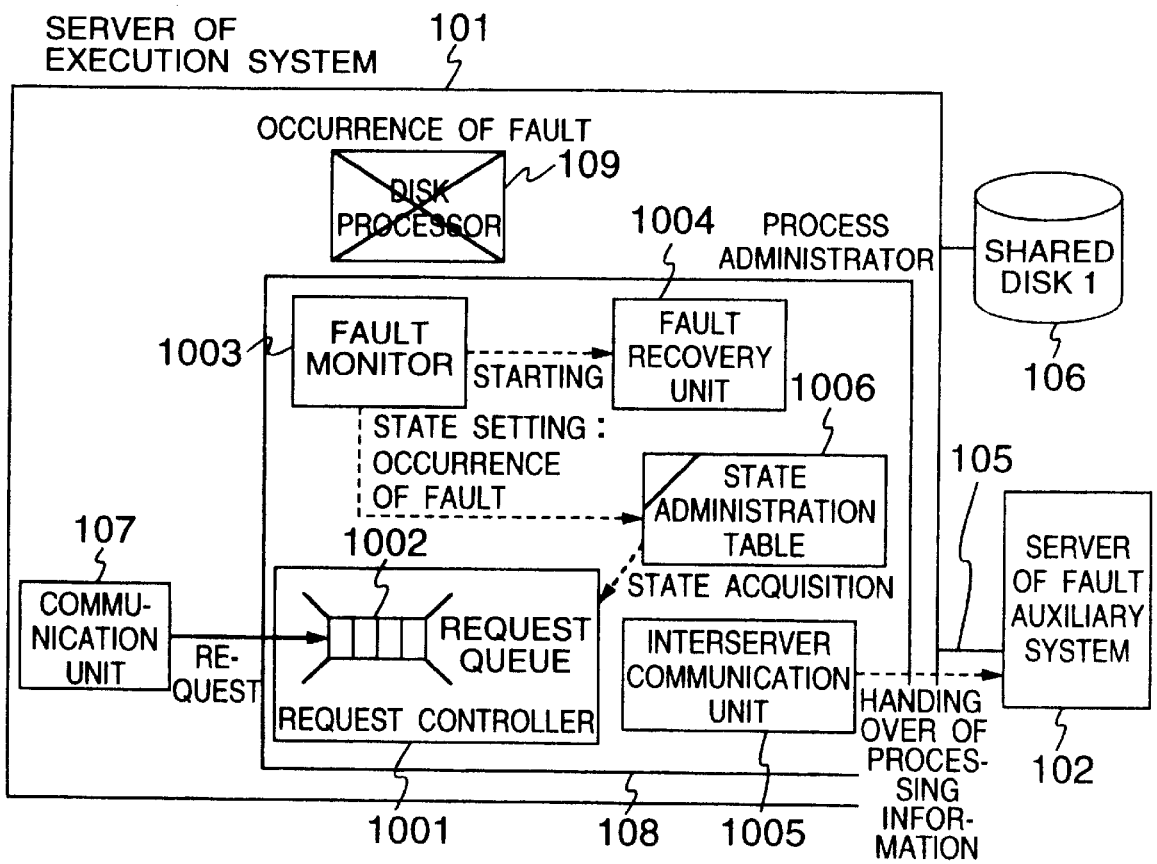
FIG. 9 is a diagram showing details of processing conducted in a process administrator in a server of execution system when a fault has occurred in the system of FIG. 1.
Figure 10:
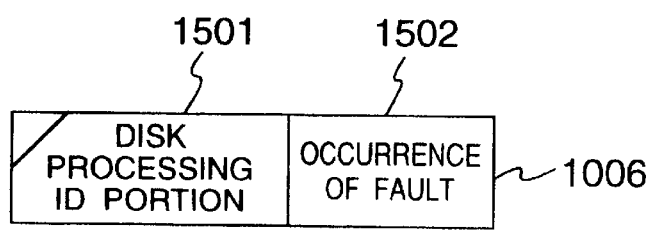
FIG. 10 is a diagram showing another example of information which is set in the state administration table illustrated in FIG. 5.

FIG. 9 is a diagram showing details of processing conducted in the process administrator in the server of execution system when a fault has occurred in the system of FIG. 1. If a fault has occurred in the monitored disk processor 109, the fault monitor 1003 shown in FIG. 9 starts the fault recovery unit 1004 and updates the state administration table 1006. Update of the state administration table 1006 is performed by changing the setting of a process state portion 1502 in a disk processing ID portion 1501 in which the fault has occurred, from "normal state" to "occurrence of fault" as shown in FIG. 10. Via the exclusive communication line 105, the process administration unit 108 hands over the processing information of the disk processor 109 on the server of execution system 101 in which the fault has occurred, to the server of fault auxiliary system 102. Processing information to be handed over is the file system structure and log information such as the number of times of access, at the time of occurrence of a fault. If a "request" from the client 103 is received from the communication unit 107 in the middle of handing over of the processing information, the request controller 1001 stores the received "request" in the request queue 1002. After handing over of the processing information has been completed, the request controller 1001 transmits the "request" to the server of fault auxiliary system 102.

Figure 11:
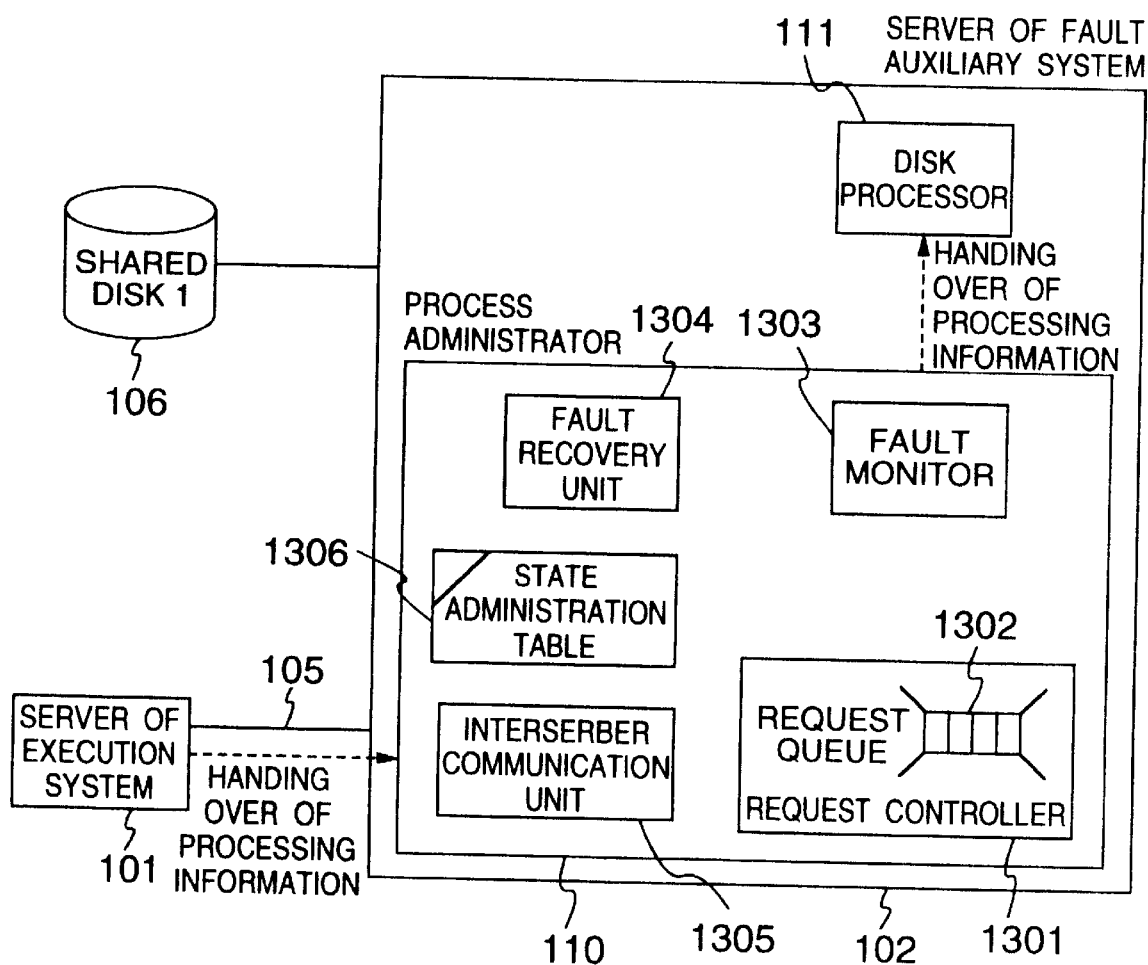
FIG. 11 is a diagram showing details of processing conducted in a process administrator included in a server of fault auxiliary system when a fault has occurred in the system of FIG. 1.

FIG. 11 is a diagram showing details of processing conducted in the process administrator in the server of fault auxiliary system when a fault has occurred in the system of FIG. 1. There is illustrated processing conducted by the process administrator 110 on the server of fault auxiliary system 102 when a fault has occurred in the disk processor 109 on the server of execution system 101. With reference to FIG. 11, the process administrator 110 receives processing information of the disk processor 109 from the server of execution system 101. The process administrator 110 then delivers the processing information to the disk processor 111 so that the disk processor 111 may conduct alternate processing for the server of execution system 101.

Figure 12:
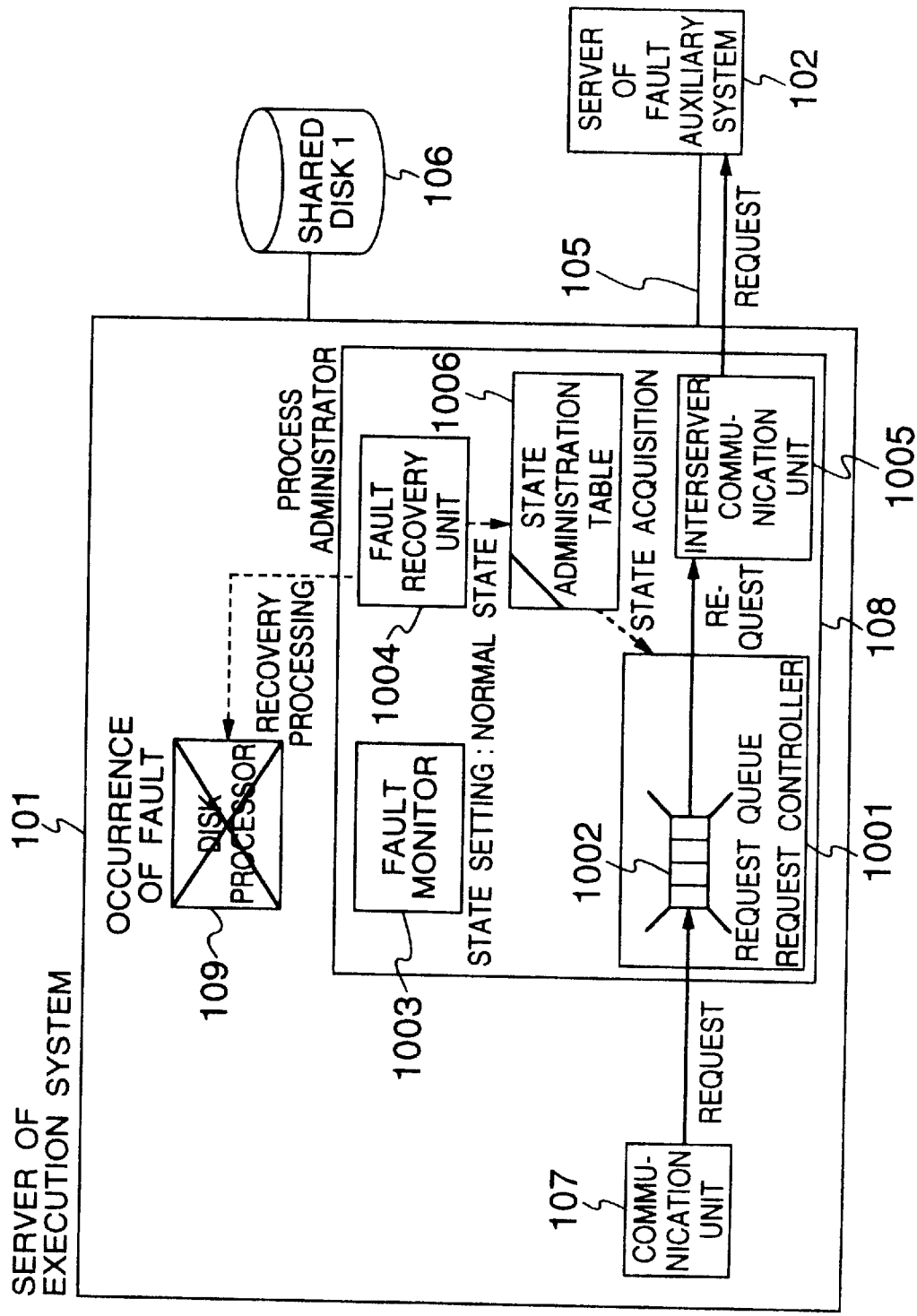
FIG. 12 is a diagram showing details of processing conducted in a process administrator included in a server of execution system in the case where the system of FIG. 1 is in the middle of recovery from a fault.

FIG. 12 is a diagram showing details of processing conducted in the process administrator in the server of execution system when the system of FIG. 1 is in the middle of recovery from a fault. With reference to FIG. 12, the fault recovery unit 1004 started by the fault monitor 1003 conducts recovery processing of the disk processor 109. Upon completion of the recovery processing, the fault recovery unit 1004 updates the state administration table 1006. Concrete update is performed by changing setting of the process state portion 1502 of the disk processing ID portion 1501 from "occurrence of fault" to "normal state." After update of the state administration table 1006 has been finished, the request controller 1001 delivers a newly received "request" to the disk processor 109 on the server of execution system 101.

Figure 13:
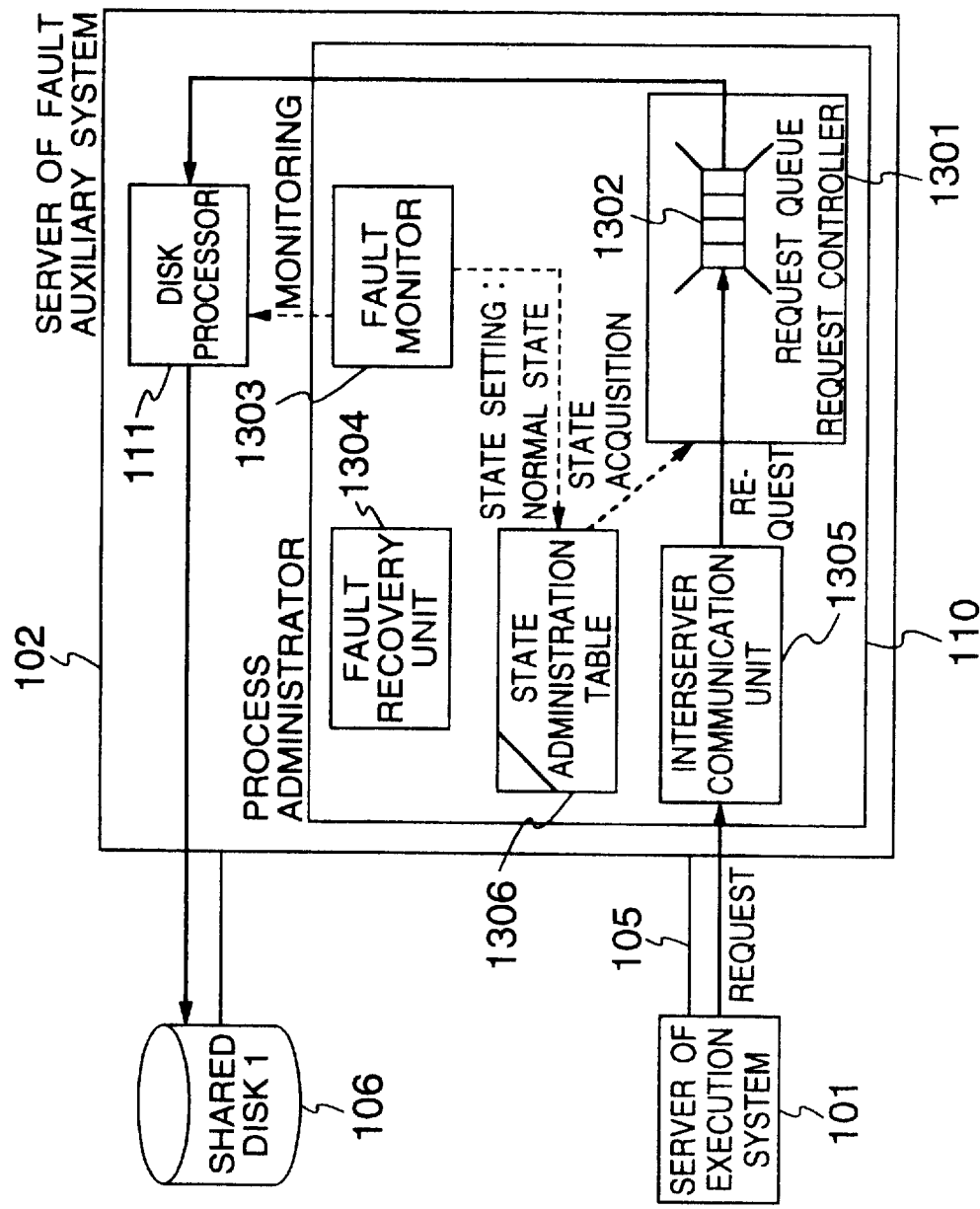
FIG. 13 is a diagram showing details of processing conducted in a process administrator included in a server of fault auxiliary system in the case where the system of FIG. 1 is in the middle of recovery from a fault.

FIG. 13 is a diagram showing details of processing conducted in the process administrator in the server of fault auxiliary system when the system of FIG. 1 is in the middle of recovery from a fault. Upon receiving a "request" from the server of execution system 101, an interserver communication unit 1305 stores the received "request" in a request queue 1302 in a request controller 1301. By referring to a state administration table 1306, the interserver communication unit 1305 acquires process information concerning the disk processor 111 which is the server processor which should conduct processing upon the "request." In the case of FIG. 13, the state of the disk processor 111 is the "normal state." Therefore, the request controller 1301 delivers the received "request" to the disk processor 111 on the server of fault auxiliary system 102. Upon receiving the delivered "request," the disk processor 111 conducts processing such as reading/writing data from/into the shared disk 106 as processing for the "request." Furthermore, the fault monitor 1303 always monitors the disk processor 111 to check whether a fault has occurred.

Even if a fault occurs on the server of execution system 101, therefore, the client 103 need not intentionally change the transmission destination of the "request," from the server of execution system 101 to the server of fault auxiliary system 102. Furthermore, the "request" from the client 103 is stored in the request queue 1002 in the request controller 1001. Even during interruption of server processing when the server of execution system 101 is handing over the processing information to the server of fault auxiliary system 102, therefore, occurrence of such a phenomenon that the "request" does not undergo the processing but is discarded is prevented. Furthermore, concurrently with transmission of the "request" to the server of fault auxiliary system 102 effected by the server of execution system 101, recovery processing of the disk procesor on the server of execution system 101 is conducted. Thereby, interruption of server processing caused by recovery processing is avoided and recovery from the fault is tried.

An embodiment in which two servers of execution system back up each other will now be described by referring to FIG. 14. The configuration and processing of the process administrator in the present embodiment are identical with those described before by referring to FIGS. 5 through 12, and hence description of them will be omitted.

Figure 14:
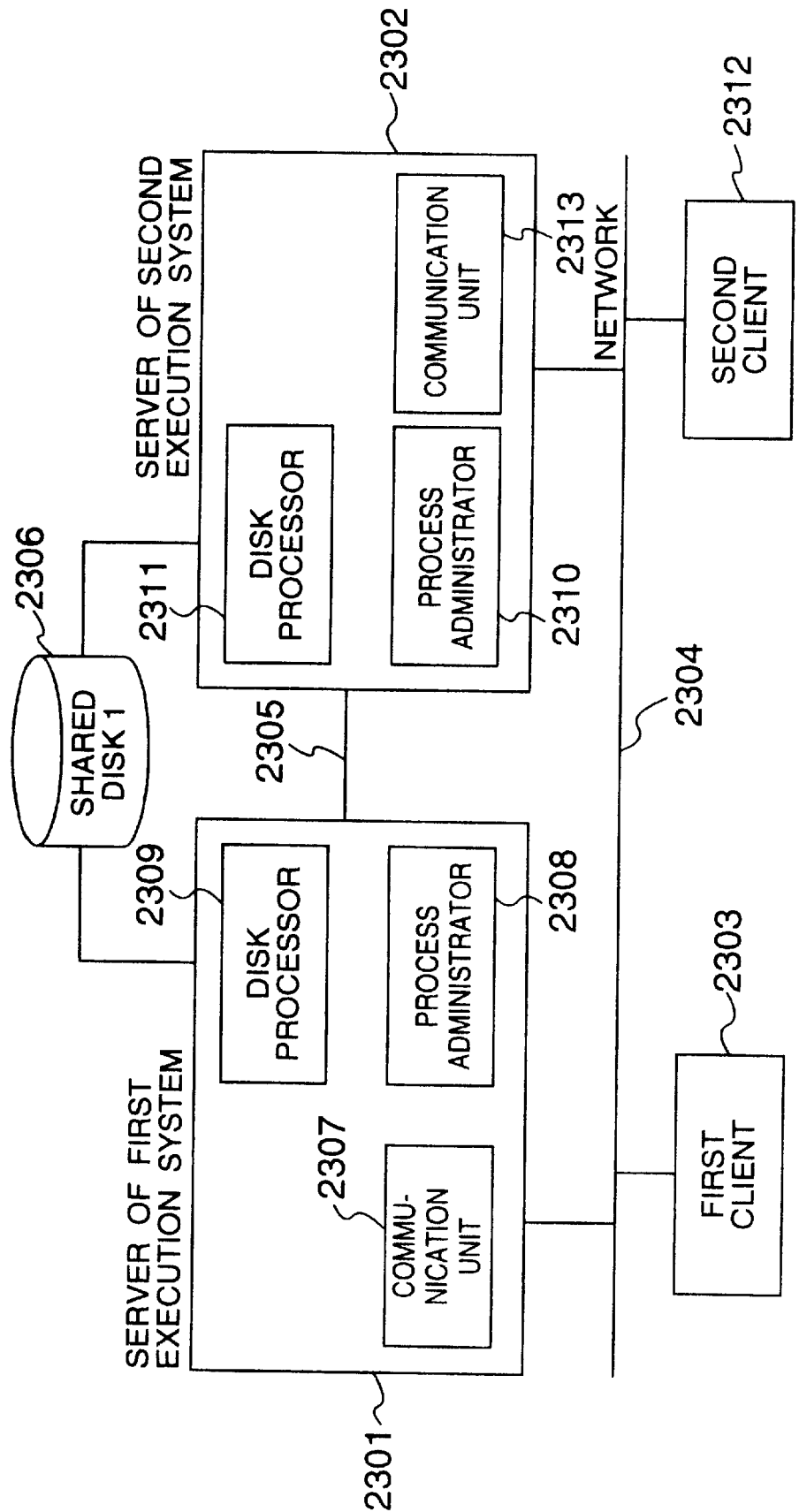
FIG. 14 is a block diagram showing the entire configuration of a second embodiment of a client server alternation control system according to the present invention.

FIG. 14 is a block diagram showing the entire configuration of a different embodiment of a client server alternation control system according to the present invention. In a client server system including a server of first execution system 2301, a server of second execution system 2302, a first client 2303 and a second client 2312, the server of first execution system 2301 and the server of second execution system 2302 back up each other.

First of all, the system configuration will now be described. With reference to FIG. 14, the server of first execution system 2301 includes a communication unit 2307 for receiving a "request" from the first client 2303, a disk processor 2309 for conducting processing upon the delivered "request," and a process administrator 2308 for delivering the "request" to the disk processor 2309, monitoring the disk processor 2309, and causing the disk processor 2309 to recover from a fault. The server of second execution system 2302 includes a communication unit 2313 for receiving a "request" from the second client 2312, a disk processor 2311 for conducting processing similar to that of the server of first execution system 2301, and a process administrator 2310 for delivering the "request" to the disk processor 2311, monitoring the disk processor 2311, and causing the disk processor 2311 to recover from a fault. The first client 2303 transmits a "request" to the server of first execution system 2301 via a network 2304. The second client 2312 transmits a "request" to the server of second execution system 2302 via the network 2304. Connection between the server of first execution system 2301 and the server of second execution system 2302 is made by an exclusive communication line 2305. Transmission of a "request" between the servers is performed via the exclusive communication line 2305.

Processing of mutual backup will now be described in brief.

In the normal state, the first client 2303 transmits a "request" to the server of first execution system 2301. Upon receiving the "request," the server of first execution system 2301 reads/writes data from/into a shared disk (1) 2306 in accordance with the "request." In the same way, the second client 2312 transmits a "request" to the server of second execution system 2302. Upon receiving the "request," the server of second execution system 2302 reads/writes data from/into the shared disk (1) 2306 in accordance with the "request."

If a fault has occurred in the disk processor 2309 in the server of first execution system 2301, the process administrator 2308 which has received a "request" from the first client 2303 transmits the "request" to the process administrator 2310 of the server of second execution system 2302 via the exclusive communication line 2305. Upon receiving the "request" from the server of first execution system 2301, the process administrator 2310 of the server of second execution system 2302 delivers the "request" to the disk processor 2311. Upon receiving the "request," the disk processor 2311 reads/writes data from/into the shared disk 2306 in accordance with the "request." At that time, the server of second execution system 2302 receives the request from the second client 2312 and conducts processing on the request.

If a fault has occurred in the disk processor 2311 in the server of second execution system 2302, the process administrator 2310 which has received a "request" from the second client 2312 transmits the "request" to the process administrator 2308 of the server of first execution system 2301 via the exclusive communication line 2305. Upon receiving the "request" from the server of second execution system 2302, the process administrator 2308 of the server of first execution system 2301 delivers the "request" to the disk processor 2309. Upon receiving the "request," the disk processor 2309 reads/writes data from/into the shared disk 2306 in accordance with the "request." At that time, the server of first execution system 2301 receives the request from the first client 2303 and conducts processing on the request.

As heretofore described, mutual backup is made possible by connecting two servers of execution system and causing mutual alternation processing at the time of occurrence of a fault.

The case where disk processing part mounted on a server of execution system 1601 and a server of fault auxiliary system 1602 includes three disk processors will now be described.

Figure 15:
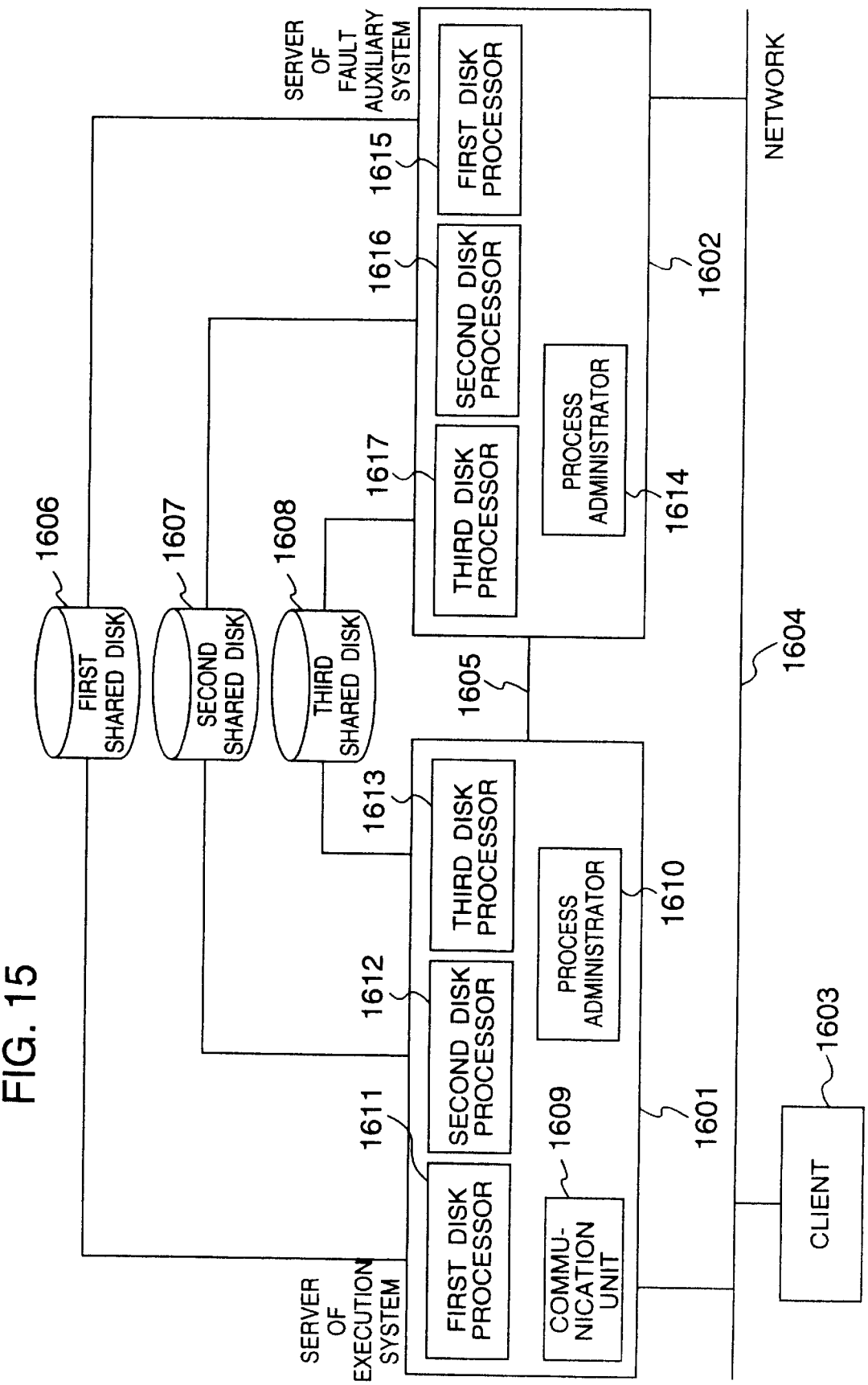
FIG. 15 is a block diagram showing the entire configuration of a third embodiment of a client server alternation control system according to the present invention.

FIG. 15 is a diagram showing the entire configuration of a different embodiment of a client server alternation control system according to the present invention. With reference to FIG. 15, a client 1603, a server of execution system 1601, and one server of fault auxiliary system 1602 are connected via a network 1604. The client 1603 transmits a "request" to a server. The server of execution system 1601 reads/writes data from/into a first shared disk 1606, a second shared disk 1607, and a third shared disk 1608 as processing for the "request." The server of fault auxiliary system 1602 conducts processing instead of the server 1601 of execution system when a fault has occurred in the server of execution system 1601. Furthermore, the server of execution system 1601 and the server of fault auxiliary system 1602 are connected by an exclusive communication line 1605. Communication between the servers is performed via the exclusive communication line 1605.

The server of execution system 1601 includes a communication unit 1609. The communication unit 1609 receives the "request" from the client 1603. Furthermore, as the server processor for conducting processing for the "request," there are provided a first disk processor 1611 for conducting processing on the first shared disk 1606, a second disk processor 1612 for conducting processing on the second shared disk 1607, and a third disk processor 1613 for conducting processing on the third shared disk 1608. Furthermore, there is provided a process administrator 1610 to deliver a "request" to each disk processor, monitor each disk processor, and conduct processing for causing each disk processor to recover from a fault.

The server of fault auxiliary system 1602 includes a first disk processor 1615, a second disk processor 1616, a third disk processor 1617, and a process administrator 1614. The first disk processor 1615, the second disk processor 1616, and the third disk processor 1617 conduct processing similar to the server of execution system 1601. When a fault has occurred in the server of execution system 1601, the process administrator 1614 accepts a "request" transmitted from the process administrator 1610 on the server of execution system 1601 and delivers the "request" to each disk processor.

An example of processing of the server processing control device in the case where a fault has occurred in the second disk processor 1612 mounted on the server of execution system 1601 will now be described by referring to FIGS. 16 through 20. Since the configuration and processing of the process administrator are identical with those described before with reference to FIGS. 5 through 12, description of them will be omitted. As for the request queue, however, a plurality of request queues are provided so as to correspond to respective disk processors.

Figure 16:
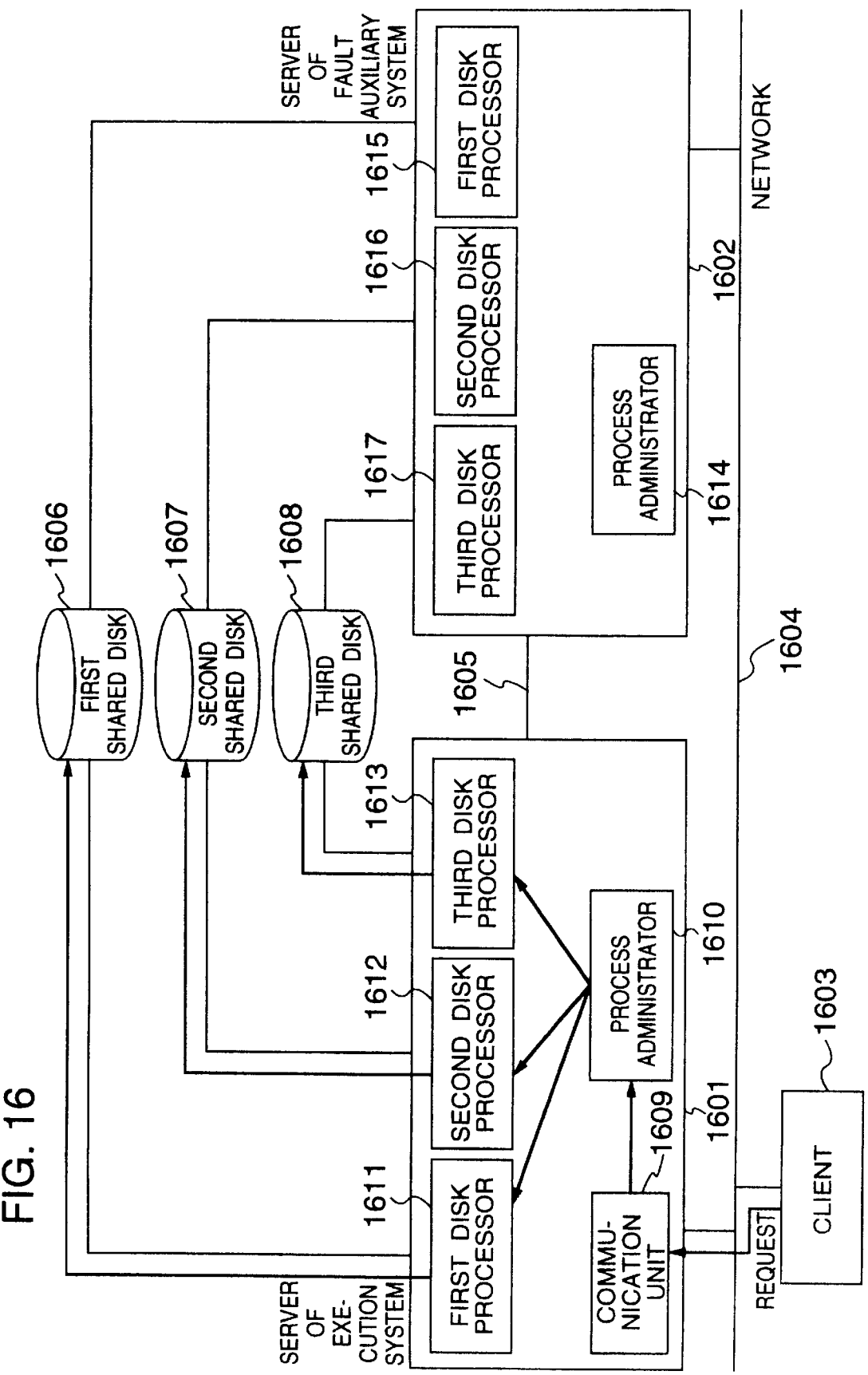
FIG. 16 is a diagram showing the flow of the entire processing in the case where the system of FIG. 15 is in the normal state.
Figure 17:
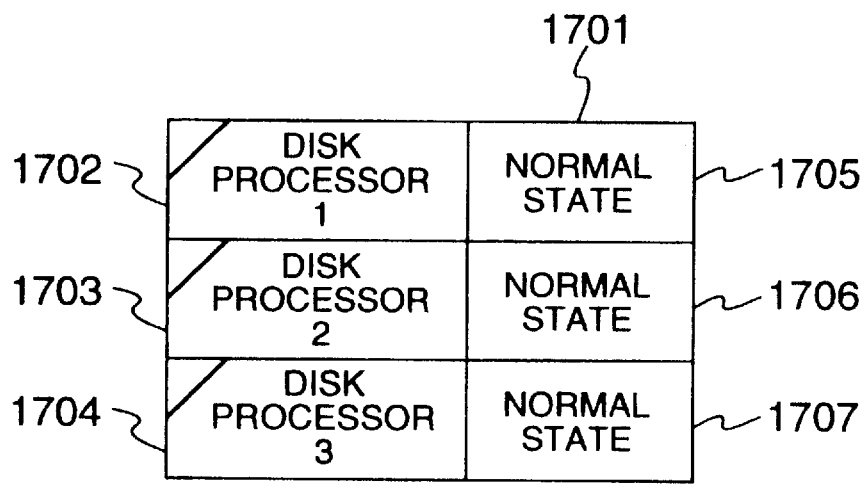
FIG. 17 is a diagram showing an example of information which is set in a state administration table in a process administrator included in a server of execution system illustrated in FIG. 15.

With reference to FIG. 16, if the client 1603 transmits a request to the server of execution system 1601 via the network 1604, the communication unit 1609 in the server of execution system 1601 receives the "request." The communication unit 1609 delivers the received "request" to the process administrator 1610. Thereupon, the process administrator 1610 checks the kind of the "request" and delivers the "request" to the first disk processor 1611, the second disk processor 1612, or the third disk processor 1613 according to the kind of the "request." Upon receiving the delivered "request," the disk processor conducts processing such as reading/writing data from/into a shared disk as processing for the delivered "request." Furthermore, the process administrator 1610 always monitors disk processors to check whether a fault has occurred in each disk processor. At this time, the state administration table has setting contents shown in FIG. 17, because all of the first disk processor 1611, the second disk processor 1612, and the third disk processor 1613 are in "normal states."

Figure 19:
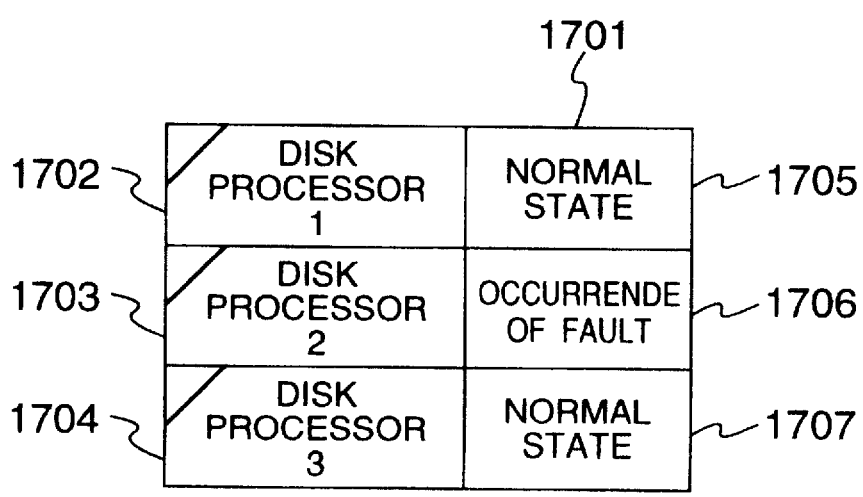
FIG. 19 is a diagram showing another example of information which is set in the state administration table in the process administrator included in the server of execution system illustrated in FIG. 15.
Figure 18:
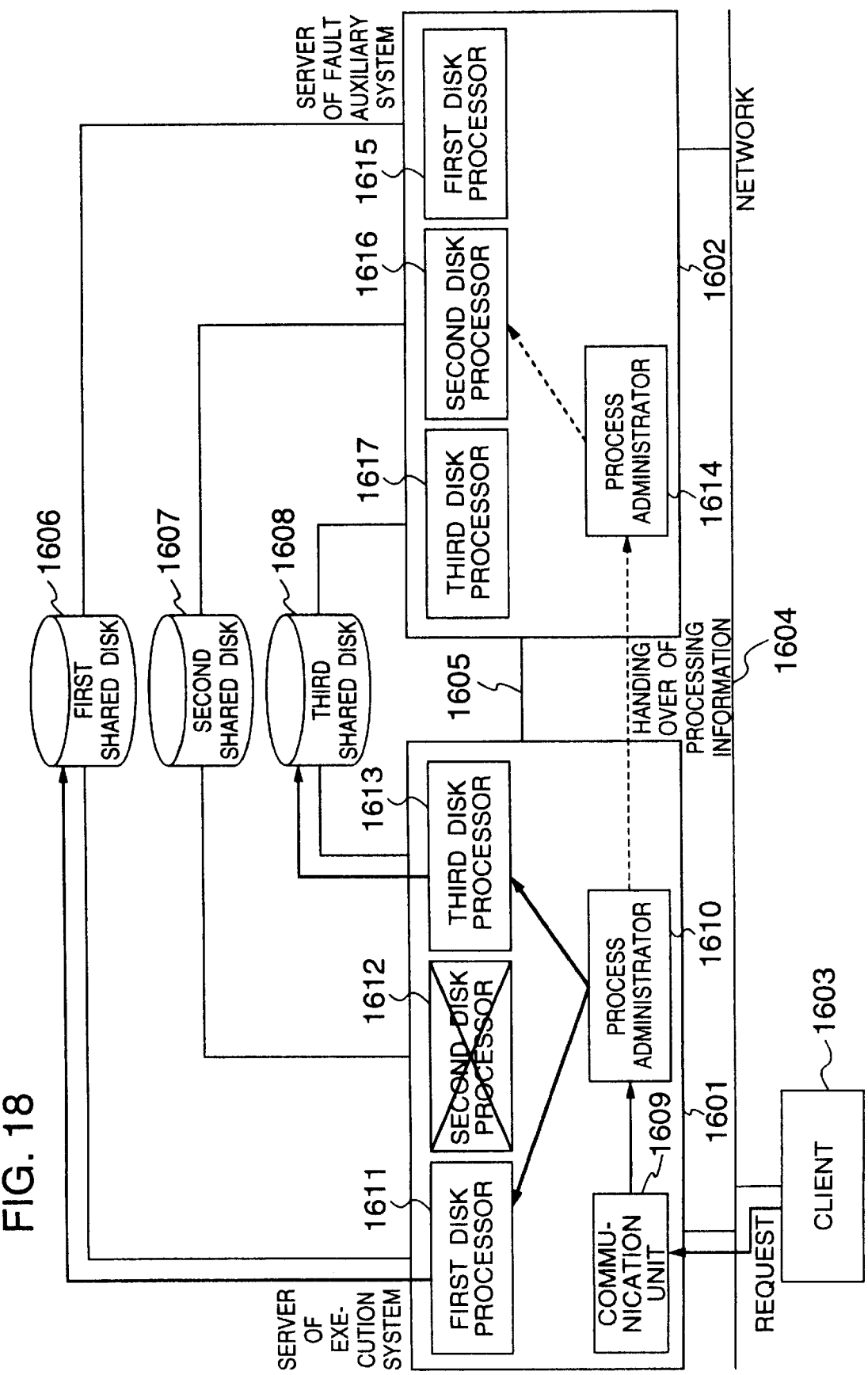
FIG. 18 is a diagram showing the flow of the entire processing conducted at the time when a fault has occurred in the system of FIG. 15.

Processing conducted when a fault has occurred in the second disk processor 1612 will now be described by referring to FIGS. 18 and 19. If a fault has occurred in the second disk processor 1612 in the server of execution system 1601 shown in FIG. 18, the process administrator 1610 hands over processing information to the process administrator 1614 on the server of fault auxiliary system 1602 via the exclusive communication line 1605. Processing information to be handed over is processing information for the second shared disk 1607 which has theretofore been conducted by the second disk processor 1612, such as the structure of the file system at the time of occurrence of the fault. Upon being subjected to handing over of the processing information effected by the server of execution system 1601, the process administrator 1614 in the server of fault auxiliary system 1602 delivers the processing information of the server of execution system 1601 to the second disk processor 1616. A "request" from the client 1603 which has arrived at the server of execution system 1601 in the middle of handing over of the processing information is stored in the request queue included in the process administrator 1610 and described before with reference to FIG. 5. After handing over is completed, the "request" stored in the process administrator 1610 is transmitted to the server of fault auxiliary system 1602. As for the state administration table at this time, "occurrence of fault" is set for the second disk processor 1612 and "normal state" is set for the first disk processor 1611 and the third disk processor 1613. Therefore, contents of setting as shown in FIG. 19 are thus obtained.

Processing at the time of recovery from a fault will now be described by referring to FIG. 20. In FIG. 20, the process administrator 1610 on the server of execution system 1601 conducts recovery processing for the second disk processor 1612 in which the fault has occurred. In the case where the "request" for the second disk processor 1612 has arrived at the server of execution system 1601 during execution of recovery processing, the process administrator 1610 transmits the "request" to the process administrator 1614 on the server of fault auxiliary system 1602. Upon receiving the "request" from the server of execution system 1601, the process administrator 1614 on the server of fault auxiliary system 1602 delivers the "request" to the second disk processor 1616. Upon receiving the delivered "request," the second disk processor 1616 conducts processing such as reading/writing data from/into the second shared disk 1607 as processing for the "request." When the recovery processing conducted for the second disk processor 1612 by the process administrator 1610 on the server of execution system 1601 is completed, the server of execution system 1601 returns to the normal state shown in FIG. 8. The process administrator 1610 delivers all "requests" received from the client 1603 to respective disk processors in the server of execution system 1601.

An example in which a "request" is transmitted in the case where a fault has occurred on an exclusive communication line between servers will now be described.

Figure 21:
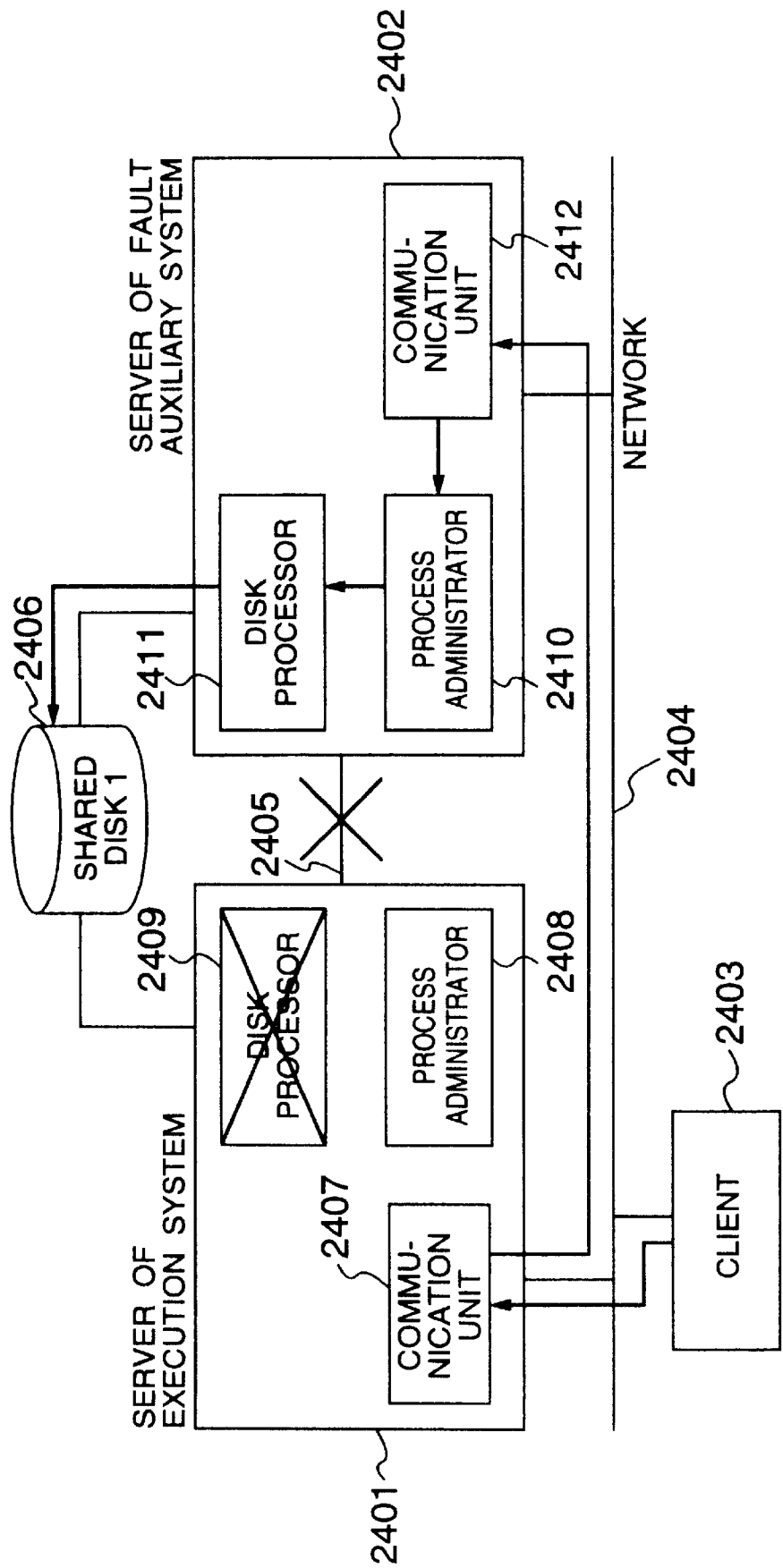
FIG. 21 is a diagram illustrating alternation control of servers effected via a network in a client server alternation control system according to the present invention.
Figure 22:
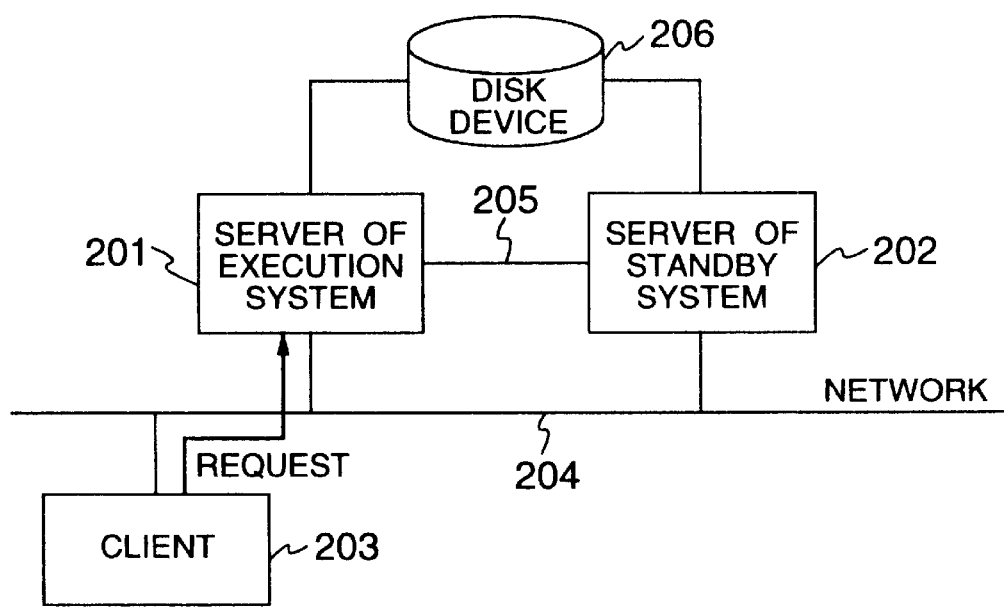
FIG. 22 is a diagram schematically showing the entire configuration of an example of a conventional client server alternation control system.
Figure 23:
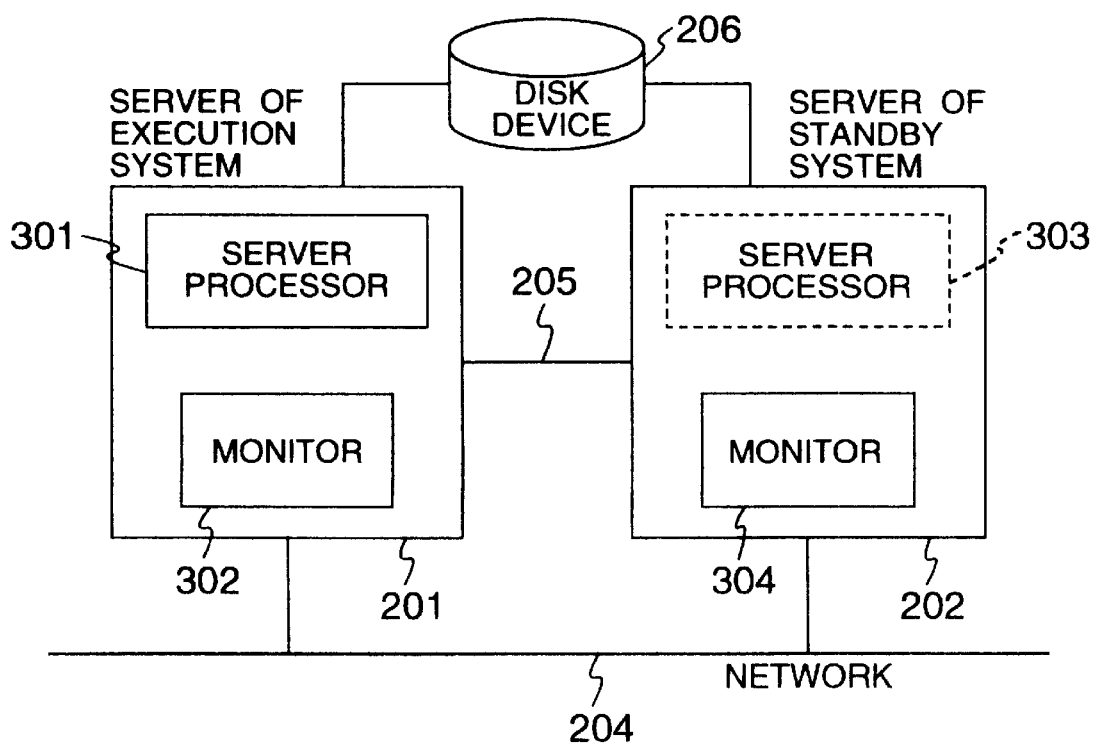
FIG. 23 is a diagram showing the configuration of a server of execution system and the configuration of a server of standby system illustrated in FIG. 22.
Figure 24:
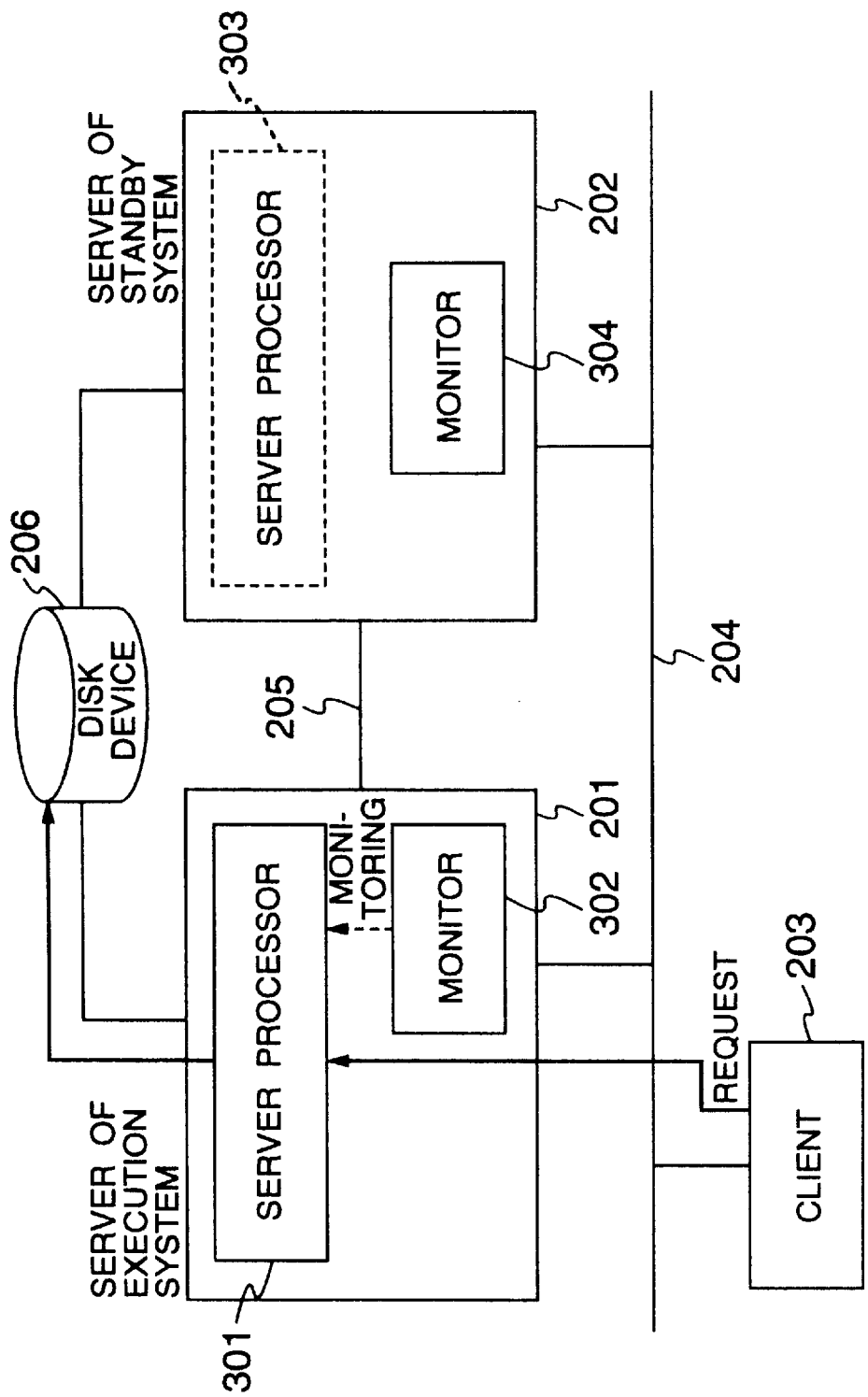
FIG. 24 is a diagram showing the flow of the entire processing in the case where the system of FIG. 23 is in the normal state.
Figure 25:
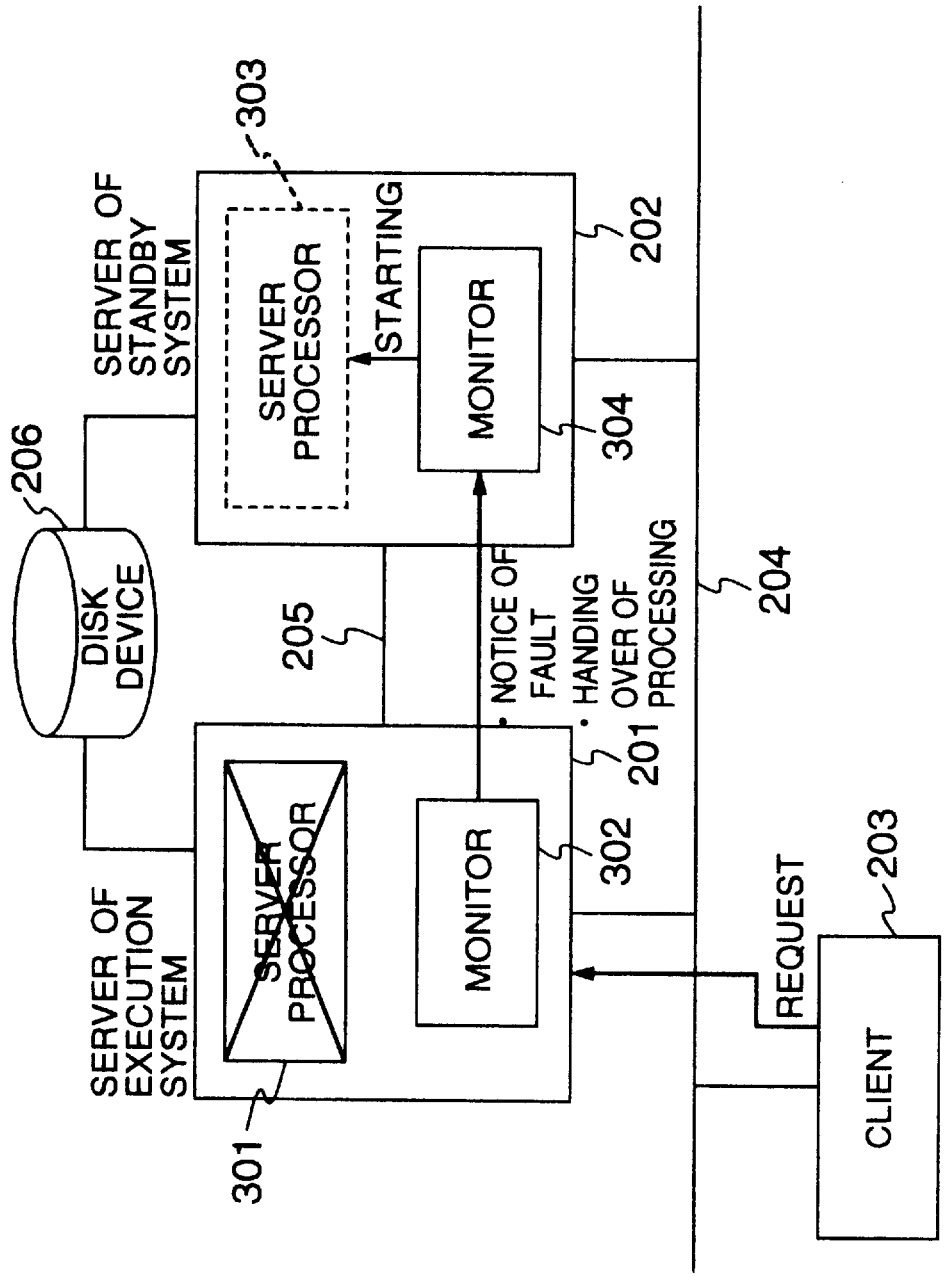
FIG. 25 is a diagram showing the flow of the entire processing conducted at the time when a fault has occurred in the system of FIG. 23.
Figure 26:
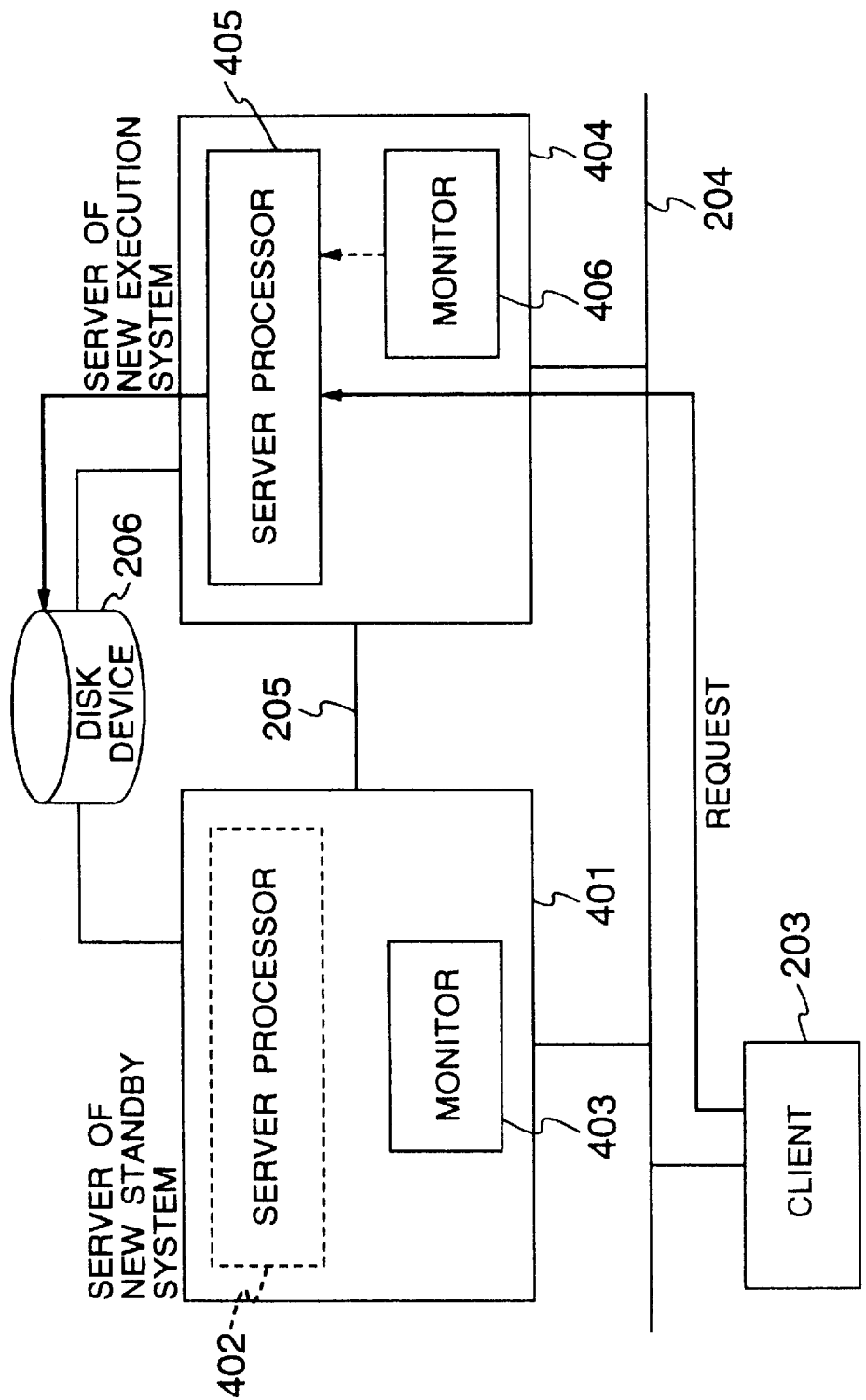
FIG. 26 is a diagram showing the flow of the entire processing conducted after recovery from a fault in the system of FIG. 15.

FIG. 21 is a diagram illustrating alternation control of server effected via a network in the client server alternation control system according to the present invention. There is shown an example in which a "request" is transmitted via a network to which a server of execution system, a server of fault auxiliary system, and a client are connected. In FIG. 21, a client 2403, a server of execution system 2401, and a server of fault auxiliary system 2402 are connected each other via a network 2404. In the case where a fault occurs on an exclusive communication line 2405 and a fault occurs in a disk processor 2409 of the server of execution system 2401, a process administrator 2408 performs (routing) setting for a communication unit 2407 to transfer, from the server of execution system 2401 to the server of fault auxiliary system 2402, a "request" received from the client 2403. In the case where thereafter the communication unit 2407 receives a "request" for the disk processor 2409 in which the fault has occurred, the communication unit 2407 does not deliver the "request" to the process administrator 2408, but transmits the "request" to the server of fault auxiliary system 2402 via the network 2404. Upon receiving the "request," a communication unit 2412 of the server of fault auxiliary system 2402 delivers the "request" to a process administrator 2410. The process administrator 2410 delivers the "request" to a disk processor 2411. In accordance with the "request," a disk processor 2411 reads/writes data from/into a shared disk (1) 2406. In this way, the "request" is transmitted from the server of execution system 2401 to the server of fault auxiliary system 2402 via the network 2404. Even if a fault has occurred on the exclusive communication line 2405, therefore, interruption of server processing can be avoided.

In the described present embodiment, one server of fault auxiliary system has been provided. Alternatively, one server or more among a plurality of servers of fault auxiliary systems may conduct alternation processing when a fault has occurred in the server of execution system, by connecting two or more servers of fault auxiliary systems to the server of execution system and adding information of each server of fault auxiliary system (such as the connection state with the shared disk and the network address) to the state administration table on the server of execution system. Thereby, reliability of server processing can be further improved. In the description of the present embodiment, transmission of a "request" from the server of execution system to the server of fault auxiliary system has been effected via the exclusive communication line. Alternatively, a "request" may be transmitted via a network to which a server of execution system, a server of fault auxiliary system, and a client are connected, without providing an exclusive communication line.

Still another embodiment of a client server system according to the present invention will be described in detail by referring to drawing. In the present embodiment, it is assumed that a client server system according to the present is applied to a remote file system for providing a plurasality of terminals (clients) with shared data (file) access service based upon a UNIX work station.

Figure 27:
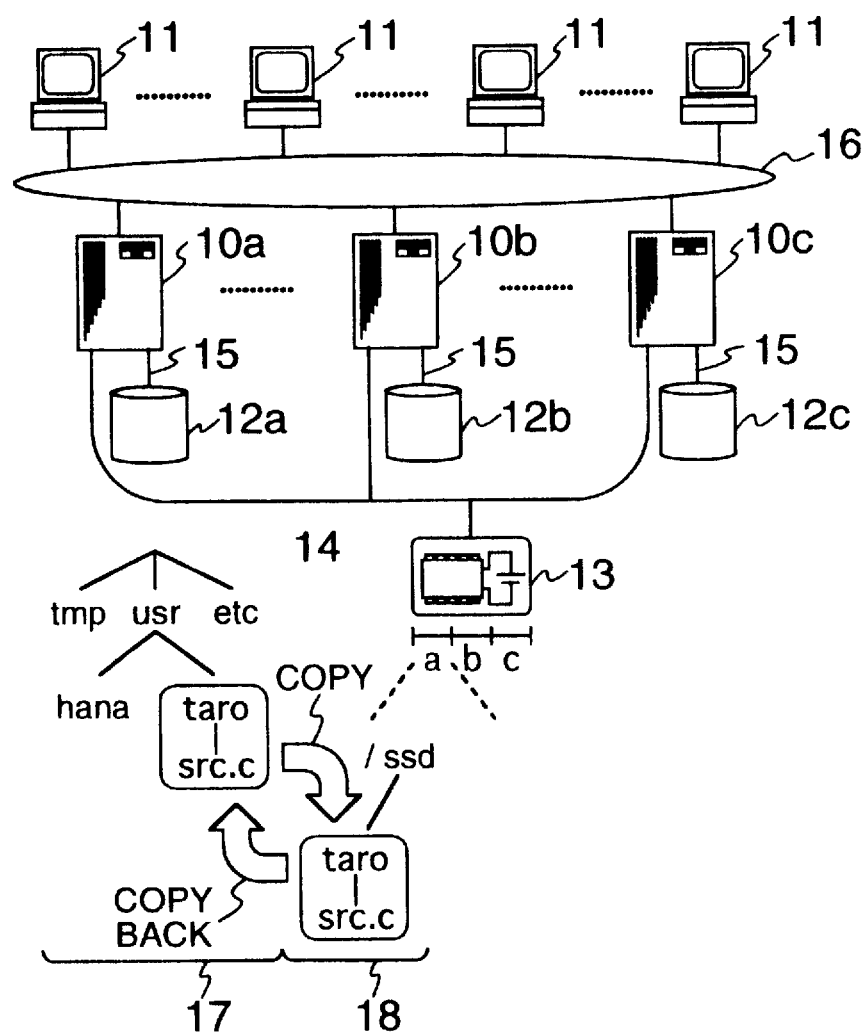
FIG. 27 is a diagram showing the configuration of a remote file system which is another embodiment of a client server system according to the present invention.

FIG. 27 is a diagram showing the configuration of a remote file system which is an embodiment of a client server system according to the present invention. In FIG. 27, 10a, 10b, 10c and 10d denote file server UNIX work stations (server machines) which provide a plurality of terminal UNIX work stations (clients) 11 connected to a local area network (LAN) 16 with shared file access service. In order to prevent to the utmost occurrence of a fault in a server machine from interrupting provision of the above described access service and thereby improve the usefulness of the system, a plurality of equal server machines are provided. For the server machines 10a, 10b and 10c, hard disk devices (HDD) 12a, 12b and 12c are provided respectively as storage media for storing shared files. Furthermore, a solid state disk device (SSD) 13 is provided. The SSD 13 includes a volatile memory and a battery. For the SSD 13, input/output access which is faster than that of the HDD 12a, 12b and 12c is possible. The HDD 12a, 12b and 12c are connected to respective corresponding server machines 10a, 10b and 10c via a SCSI (Small Computer System Interface) 15, which is the standard of the general purpose external device connection interface in UNIX work stations. Furthermore, the SSD 13 is connected to all of the server machines 10a, 10b and 10c via a shared input/output interface 14. The shared input/output interface 14 is used in common by a plurality of server machines 10a, 10b and 10c.

Portions of the HDD 12 used in the above described device configuration and accessed by the client are copied into the SDD 13 at the time of system start-up.

For example, in the case where the HDD 12a has hierarchical data 17 and a file required to provide the client 11 with shared file access service is a file located under "/usr/taro" directory in a route file area 17, the whole directory is copied beforehand in a location 18 under a "/ssd" directory in the ssd. With reference to FIG. 27, the file structure of only the server machine has been described. For other server machines 10b and 10c as well, similar operation is conducted in allocated areas of the HDD 12b, HDD 12c and SSD 13.

If the client 11 accesses the "/usr/taro" directory, for example, the server automatically changes over to access to the "/ssd" directory and in fact only the SSD 13 is accessed. Therefore, every access to the file copied into the SSD 13 is performed only on the SSD 13.

When the system is deactivated or at fixed time intervals, the directory of the SSD 13 is copied back into the directory of the HDD 12 and updated information on the SSD 13 is reflected onto the HDD 12.

Even if any one of servers should fail, the file to be accessed is on the SSD 13 and consequently the object file can be accessed via another normal server.

Figure 28:
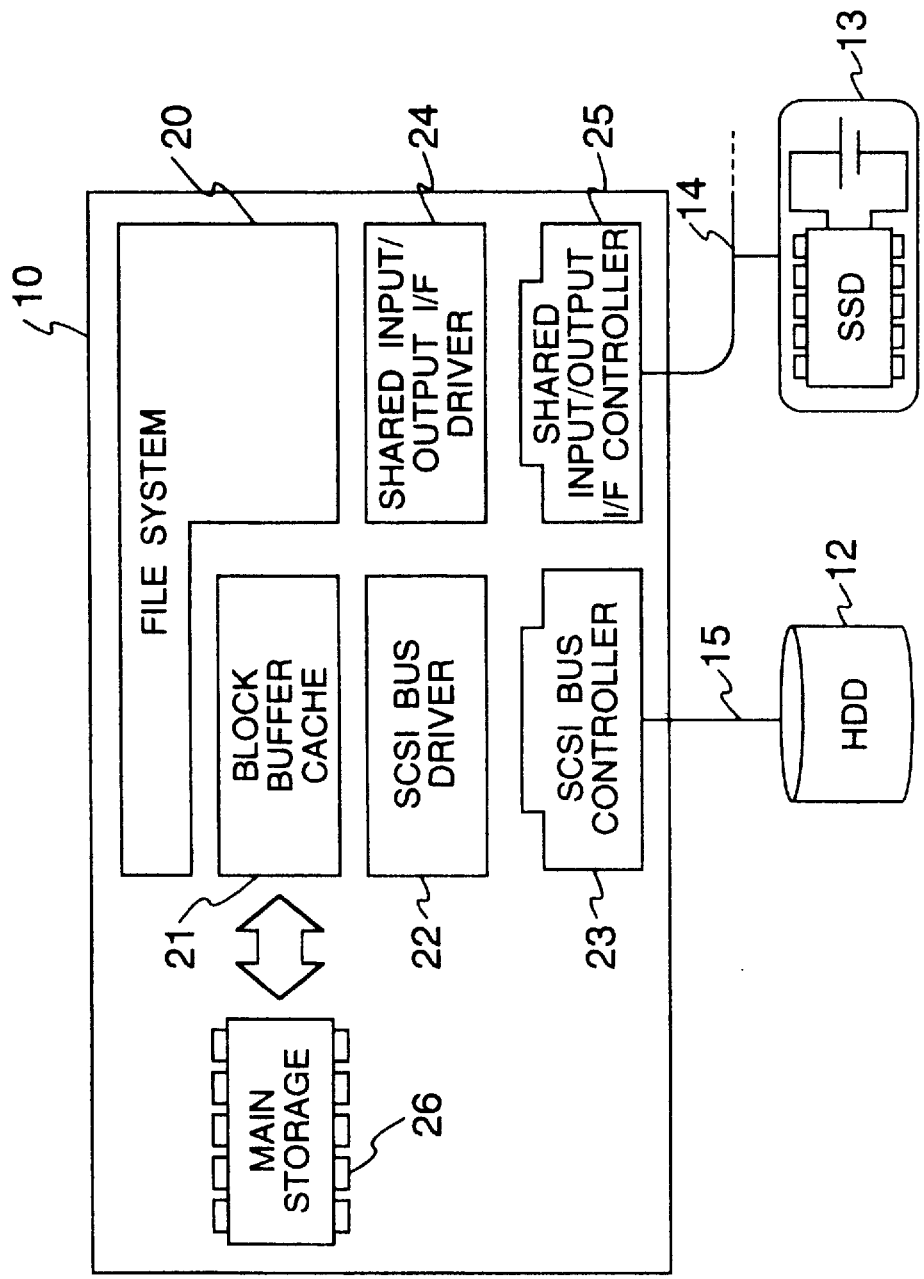
FIG. 28 is a diagram showing the configuration of a portion of a server machine illustrated in FIG. 27 relating to input/output processing.

FIG. 28 is a diagram showing the configuration of a portion of a server machine illustrated in FIG. 27 relating to input/output processing. In FIG. 28, a file system 20 administers and manipulates data stored in the HDD 12a (12b, 12c) and the SSD 13 by taking a file as the unit. A block buffer cache 21 make adjustments so as to make the size of inputted/outputted data equal to integer times the storage size on the HDD. The storage size on the HDD is in many cases one sector which is equivalent to 512 bytes. For the purpose of reducing the number of times of input/output processing for the HDD 12a (12b, 12c) which is significantly slow in input/output access speed because of inclusion of a mechanical component, the block buffer cache 21 causes data to be temporarily held in a main storage 26 in the server machine. A SCSI bus driver 22 effects operation control of a SCSI bus controller 23. The SCSI bus controller 23 inputs/outputs data to/from the HDD 12 via the SCSI bus 15. A shared input/output interface driver 24 effects operation control of a shared input/output interface controller 25. The shared input/output interface controller 25 inputs/outputs data to/from the SSD 13 via the shared input/output interface 14. Essentially, the SSD 13 is nearly equivalent in function and access time to the main storage 26 in the server machine 10a (10b, 10c). The SSD 13 is capable of rapidly reacting to the input/output processing of the server machine 10a (10b, 10c). For the SSD 13, there is no restriction concerning the data storage size (block) of a byte train unlike the hard disk device. Therefore, the server machine 10a (10b, 10c) can conduct data input/output manipulation directly to the SSD 13 without intervention of a temporary buffer such as the above described block buffer cache 21.

A shared input/output interface used when the SSD is connected to a plurality of server machines will now be described.

Figure 29A:
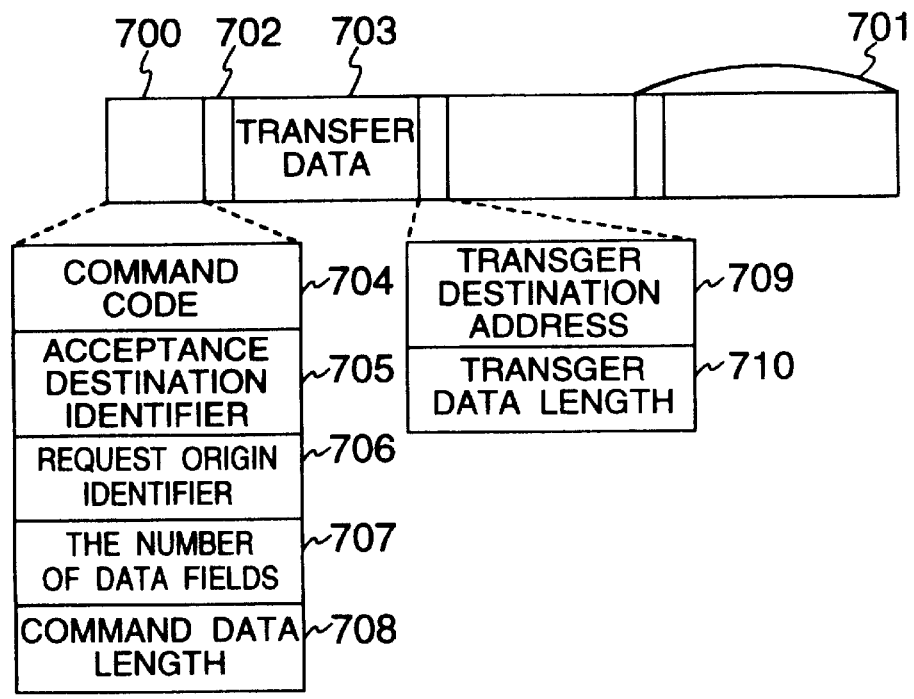
FIGS. 29A and 29B are diagrams showing an example of a form of frame data transmitted via a shared input/output interface.
Figure 29B:
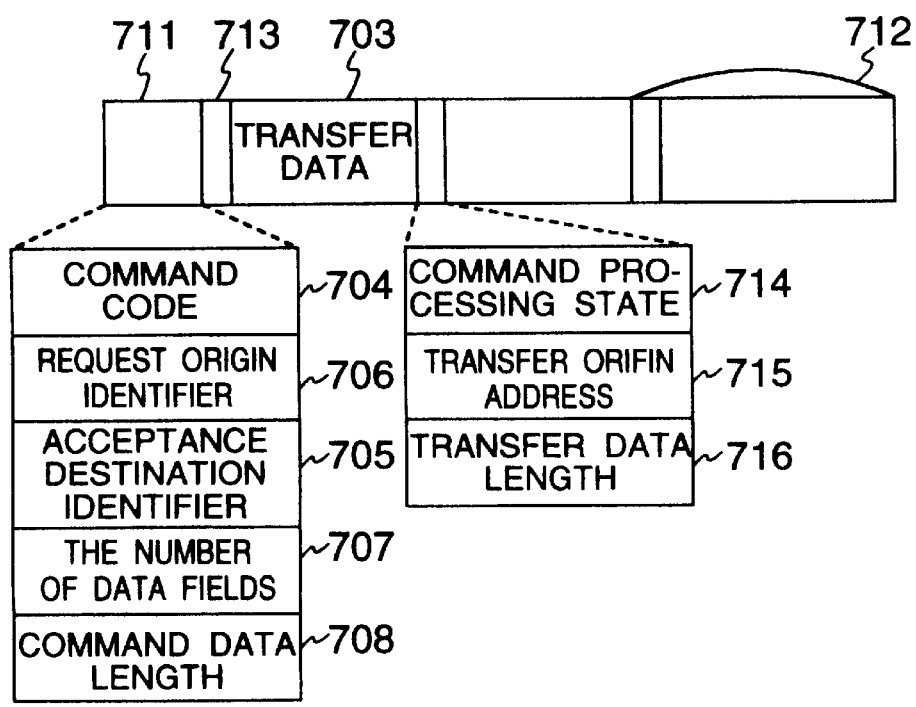
Figure 31:
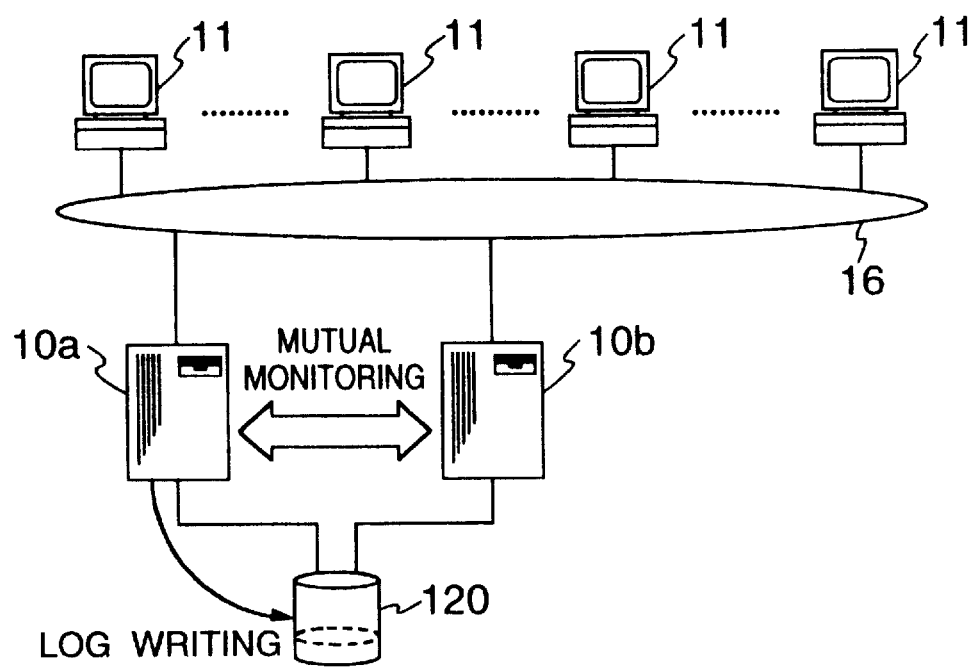
FIG. 31 is a diagram showing the configuration of a remote file system which is an example of a conventional client server system.
Figure 32:
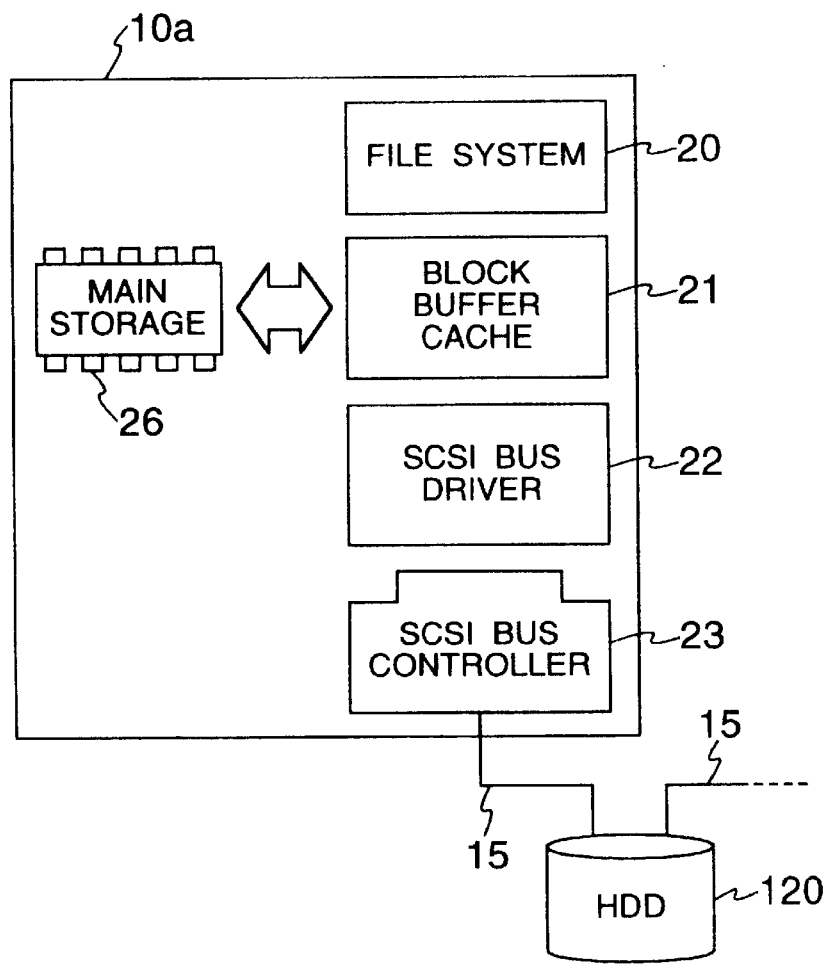
FIG. 32 is a diagram showing the configuration of a portion of a server illustrated in FIG. 31 concerning input/output processing.
Figure 33:
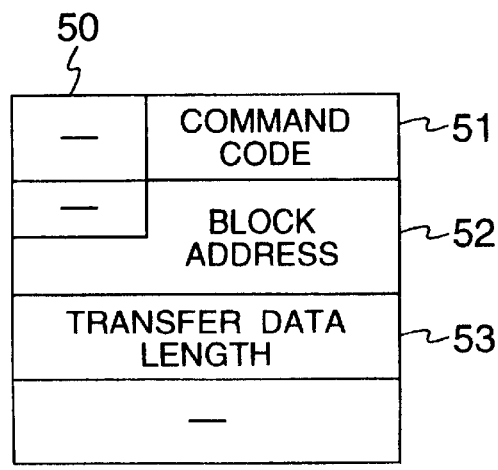
FIG. 33 is a diagram showing an example of a form of a command block which controls transmission effected via a SCSI bus illustrated in FIG. 32.
Figure 34:
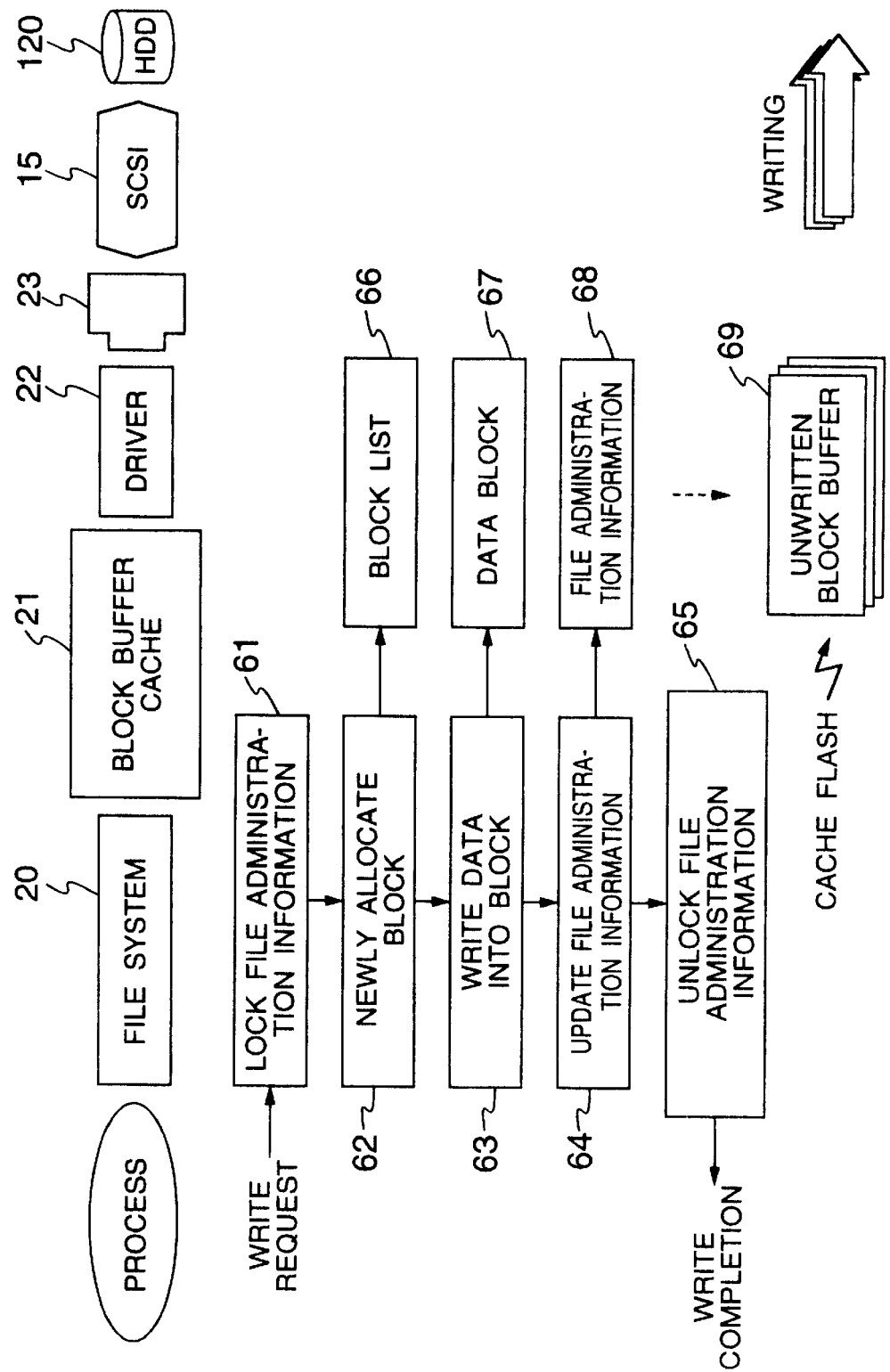
FIG. 34 is a diagram showing the flow of file writing processing in a conventional client server system.

FIGS. 29A and 29B are diagrams showing an example of the form of frame data transmitted between the SSD and the server via the shared input/output interface of FIG. 28. FIG. 29A shows the format of an input/output request frame. FIG. 29B shows the format of an input/output answer frame.

With reference to FIG. 29A, a request frame includes a command block 700 and a plurality of request data fields 701. The command block 700 includes a command code 704, an acceptance destination identifier 705, a request origin identifier 706, the number of data fields 707, and a command data length 708. The command code 704 indicates contents of input/output manipulation. The acceptance destination identifier 705 indicates destination which should conduct processing on the request frame. The request origin identifier 706 indicates the issue origin of the request frame. The number of data fields 707 indicates the number of data transferred in the request frame (the number of request data fields 701). Each request data field 701 includes a request data field header 702 and transfer data 703. The request data field head 702 includes a transfer destination address 709 and a transfer data length 710. The transfer destination address 709 indicates the storage destination of corresponding transfer data 703. The transfer data length 710 indicates the length of the transfer data 703.

With reference to FIG. 29B, an answer frame includes a reply block 711 and a plurality of answer data fields 712. Components of the reply block 711 are identical with those of the command block 700 with the exception that the acceptance destination identifier 705 and the request origin identifier 706 are reversed in order. Each answer data field 712 includes an answer data field header 713 and transfer data 703. The answer data field header 713 includes command processing information 714, a transfer origin address 715, and a transfer data length 716. The command processing information 714 indicates a result of command processing of each of request data fields 701 requested in the above described request frame. The transfer origin address 715 indicates the storage origin of the corresponding transfer data 703. The transfer data length 716 indicates the length of the transfer data 703.

In the request data field 701 included in the request frame at the time of reading operation and the answer data field 712 included in the answer frame at the time of writing operation, the transfer data 701 is not included and consequently a value "zero" is set in the transfer data length 710.

To the shared input/output interface controller 25 and a corresponing SSD, an identifier which is unique in the system is allocated. This identifier is set in the request origin identifier 705 and the acceptance destination identifier 706 included in the request frame and the answer frame. Transmission of the above described request frame and answer frame to the shared input/output interface 14 is performed by racing control using CSMA/CD (Carrier Sense Multiple Access with Collision Detection) standardized in IEEE 802.3 or by a multiplexing system having a band divided so as to be associated with respective identifiers.

An example of manipulation procedure of file access to the SSD implemented by the above described internal configuration of the UNIX work station (server machine) and shared input/output interface will now be described.

FIG. 30 is a diagram showing the flow of file writing processing. Upon receiving a write request from a process under execution, a file system 20 shown in FIG. 30 conducts lock processing for declaring that it has acquired the procesing right of file administration information in the file system corresponding to the file indicated by the write request (step 81). Thereafter, the file system 20 performs block allocation of a buffer for newly storing data of the write request, updates a pertinent location of a block list for administering empty blocks, and registers an update block list data 88 indicating that update location into an input/output request buffer 80 in the shared input/output interface driver 24 (step 82). The data which is the subject of the write request is written into the newly allocated block and registered into the input/output request buffer 80 as write data 89 (step 83). Thereafter, the system block information having data written therein is set in the pertinent file administration information and registered into the input/output request buffer 80 as update file administration information 90 (step 84). A write request of update data registered in the input/output request buffer 80 is then made to the shared input/output interface driver 24 (step 85). Upon receiving the write request from the file system 20, the shared input/output interface driver 24 transmits the request frame illustrated in FIG. 29A to the SSD 13 and thereby writes collectively a plurality of update data registered in the input/output request buffer 80 (step 86). After collective writing effected by the shared input/output interface driver 24 has been completed, the file system 20 conducts unlock processing for declaring that the file system 20 abandons the processing right of the file administration information (step 87) and informs the request process of completion of file writing processing. When the process is informed of writing completion, therefore, writing into the SSD is actualy completed.

We claim:

1. A client server system including a client, a plurality of servers, and a network, said client originating a request and thereby making a processing request, said request determining contents of processing, said servers conducting server processing corresponding to a processing request specified in each request, said network performing transit transmission of requests and connecting the client to a plurality of servers, each of said servers comprising:

a disk processor for conducting server processing; and a process administrator, responsive to occurrence of a fault in the disk processor, to transfer said request to another server and thereby cause said another server to conduct processing on said request, wherein one of said servers has a plurality of said disk processors, and wherein said process administrator of said one of said servers transfers only requests to be transferred to a faulty disk processor to another server.

2. A client server system including a client, a plurality of servers, and a network, said client originating a request and thereby making a processing request, said request determining contents of processing, said servers conducting server processing corresponding to a processing request specified in each request, said network performing transit transmission of requests and connecting the client to a plurality of servers, each of said servers comprising:

a disk processor for conducting server processing; and a process administrator, responsive to occurrence of a fault in the disk processor, to transfer said request to another server and thereby cause said another server to conduct processing on said request, said process administrator comprising:

a state administration table for registering a state of the disk processor therein and disk connection states of other servers and network address information; and a fault monitor for monitoring occurrence of a fault in the disk processor and updating said state administration table, and wherein said process administrator performs request transfer in accordance with contents of said state administration table, determines a server of request transfer destination in accordance with information of other servers in said state administration table, determines a plurality of request transfer destination servers and transfers requests distributively.

3. A client server system comprising:

clients;

a plurality of servers, each server having a hard disk device;

a network for connecting said clients to said servers; and a solid state disk device (SSD) connected to all of said servers, said solid state disk device including a volatile memory and a battery, inputting/outputting with a higher speed as compared with said hard disks being possible in said solid state disk device.

4. A client server system according to claim 3, wherein each of said servers copies a file system from the hard disk device to said SSD and conducts server processing by using the file system on said SSD.

5. A client server system according to claim 4, wherein upon receiving a data write request from a client, the server writes data into said SSD at a time and after the writing operation has been completed the server returns an answer to the client to inform the client of completion of data writing.

6. A service method in a client server system, said client server system including clients, a plurality of servers each having a hard disk device, and a network for connecting said clients to said servers, said service method comprising the steps of:

preparing a solid state disk device (SSD) connected to all of said servers, said solid state disk device including a volatile memory and a battery, inputting/outputting with a higher speed as compared with said hard disks being possible in said solid state disk device;

copying, at the time of network system start-up, a file included in the hard disk device in each of said servers and to be accessed by a client into said SSD, said SSD being shared by said plurality of servers;

upon receiving, from a client, a request for access to a hard disk device in a server, changing the request to a request for access to said SSD and accessing a file on said SSD; and copying back the file of said SSD into a hard disk device of each server at certain predetermined time.

7. A server group including a plurality of servers connected to each other via a network, said servers conducting server processing corresponding to a processing request specified in a received request, said servers transmitting requests via said network, each of said servers comprising:

a disk processor for conducting server processing; and a process administrator, configured to detect the occurrence of a fault in the disk processor and, in response to the detected fault, to transfer said request to another server and thereby cause said another server to conduct processing on said request.

8. A server group according to claim 7, wherein said plurality of servers are connected by an exclusive communication line of said network, and said process administrator of each one of the servers transfers said request via said exclusive communication line.

9. A server group according to claim 7, wherein said process adminstrator of each one of the servers transfers said request via said network.

10. A server group according to claim 7, wherein each one of said servers has a plurality of said disk processors, and wherein said process administrator transfers only requests to be transferred to a faulty disk processor to another server.

11. A server group according to claim 7, wherein said process adminstrator of the server comprises:

a state administration table for registering a state of the disk processor therein and disk connection states of other servers and network address information; and a fault monitor for monitoring occurrence of a fault in the disk processor and updating said state administration table, and wherein said process administrator performs request transfer in accordance with contents of said state administration table, determines a server of request transfer destination in accordance with information of other servers in said state administration table, determines a plurality of request transfer destination servers and transfers requests distributively.

12. A service method in a server, said server having a hard disk device, said service method comprising the steps of:

preparing a solid state disk device (SSD) connected to said server, said solid state disk device including a volatile memory and a battery, inputting/outputting with a higher speed as compared with said hard disks being possible in said solid state disk device;

copying, at the time of server start-up, a file included in the hard disk device in said server and to be accessed into said SSD;

upon receiving a request for access to the hard disk device in the server, changing the request to a request for access to said SSD and accessing a file on said SSD; and copying back the file of said SSD into the hard disk device of the server at a certain predetermined time.

* * * * *